(12) United States Patent
Fukushima et al.

(10) Patent No.: US 6,584,402 B2
(45) Date of Patent: Jun. 24, 2003

(54) COMMUNICATION NAVIGATION SYSTEM AND METHOD, PROGRAM STORAGE DEVICE AND COMPUTER DATA SIGNAL EMBODIED IN CARRIER WAVE

(75) Inventors: Atsuhiko Fukushima, Saitama (JP); Toru Fujita, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/232,818

(22) Filed: Sep. 3, 2002

(65) Prior Publication Data

US 2003/0050751 A1 Mar. 13, 2003

(30) Foreign Application Priority Data

Sep. 3, 2001 (JP) .................................. 2001-266470

(51) Int. Cl.⁷ ............................................. G01C 21/34
(52) U.S. Cl. ...................... 701/202; 701/208; 701/209; 342/357.01
(58) Field of Search ................................ 701/202, 201, 701/200, 207, 208, 209, 210, 211, 213; 342/417, 453, 357.01, 357.06

(56) References Cited

U.S. PATENT DOCUMENTS 6,127,975 A * 10/2000 Maloney ..................... 342/457
6,434,479 B1 * 8/2002 Kondou et al. ............. 701/203
6,484,093 B1 * 11/2002 Ito et al. ..................... 701/211

FOREIGN PATENT DOCUMENTS

WO            97/4257      *   4/1997

* cited by examiner

Primary Examiner—Richard M. Camby
(74) Attorney, Agent, or Firm—Sughrue Mion, PLLC

(57) ABSTRACT

A communication navigation system is provided with a communication center apparatus (3) and a communication terminal apparatus (4, 5), both of which transmit and receive information by two-way communication through a communication network (1, 2). The communication center apparatus is provided with: a processing device (72) for generating request correspondence information including route information indicating a planned route corresponding to request information and generating, if at least one portion of the planned route is present out of a service area of the communication navigation system, announcement information for announcing this fact; and a center side communication device (71, 73) for receiving the request information and transmitting the request correspondence information and the announcement information through the communication network. The communication terminal apparatus is provided with: a terminal side communication device (38) for transmitting the request information and receiving at least the announcement information through the communication network; and an input device for inputting the request information and giving an opportunity of inputting the request information in response to the reception of the announcement information.

28 Claims, 12 Drawing Sheets

COMMUNICATION NAVIGATION SYSTEM AND METHOD, PROGRAM STORAGE DEVICE AND COMPUTER DATA SIGNAL EMBODIED IN CARRIER WAVE

BACKGROUND OF THE INVENTION

1. Field of the Invention

The present invention relates to a communication navigation system and method for automobile use or the like, which can perform navigation processing, such as route search, route navigation, map display, and the like, at least partially by using a communication network, as well as a program storage device and a computer data signal embodiment in a carrier wave.

2. Description of the Related Art

Nowadays, research and development on electronic control for controlling the drive of a vehicle are advanced, and navigation systems for aiding in driving are significantly spread and popularized. This navigation system generally has various databases and such a basic structure that displays, on a display device, map information, current position information, various guidance information, and the like. Moreover, it searches for a drive route on the basis of an inputted condition.

Generally speaking, a function called "route search" or "path search" of a navigation apparatus mounted on a vehicle is designed to be capable of searching for an optimum route connecting an origin and a destination, both of which are designated by a user. It is also designed to lead and guide (navigate) the user to the destination by displaying on a map a current position based on a self-contained or built-in positioning measurement or a GPS (Global Positioning System) measurement and the searched optimum route.

With respect to a traditional navigation apparatus, this kind of route search is performed by microprocessor processing in the apparatus on the basis of the map database information stored in a map information recording medium (e.g. DVD-ROM) set in the navigation apparatus. More concretely, the route search is executed by using "information for route search", which enables a search for the optimum route based on predetermined mathematical algorithm, such as link information corresponding to a road part between branching points and intersections, node information including coordinates information (absolute position information on latitude and longitude, or on altitude, latitude and longitude) corresponding to the branching points and the intersections of roads or the like among the map database information. Generally, in view of its nature of being for route search, this kind of information for route search is constructed by the link information, the node information, and the like, which are about broad areas where roads are mutually connected, for example, such as throughout Honshu or the main island of Japan, throughout Japan, or the like, so that its volume of data becomes enormous, which increases the whole amount of data of the map database information.

Moreover, the map database information includes data of added information, which is facility guidance information on tourist attractions/facilities, facility numerals, names (characters) of maps/roads, views of waters/railroads, and roads, in each one of many pieces of map information (drawings). These data as well as the above-described information for route search further increase the volume of data of the map database information.

By the way, the search for the optimum route requires the newest map database information because of changes, new constructions, and the like on roads.

Therefore, there is a need to equip for the traditional navigation apparatus a map information recording medium that stores the map database information which is the newest and whose data volume is enormous. At the same time, there is a need of the display processing and the search processing of the optimum route based on the complicated map database information. In this case, there is a need to mount a microprocessor unit (MPU), which is capable of high-speed processing, so that the scale of the processing and that of the apparatus come to increase.

On that account, various communication navigation systems are suggested in order to improve such increase of the scale of the processing and that of the apparatus. In these communication navigation systems, the map database information is obtained and provided through two-way wireless communication between a communication center apparatus on a communication network and a communication navigation terminal mounted on a vehicle (e.g. refer to the examples of Japanese Patent Application Laying Open NO. Hei 7-262493 "a system for distributing map information for a movable body" and Japanese Patent Application Laying Open NO. Hei 10-96644 "a system for guiding a moving route").

The communication center apparatus in the communication navigation system in this kind can quickly and cheaply provide the newest map database information, because, for example, all we need is update the map database information of one communication center apparatus to the newest information, comparing to the case of providing an information recording medium, which stores the newest map database information, for an individual navigation apparatus mounted on a movable body. Therefore, users side becomes able to receive the map database information including the newest information for route search or the like.

Moreover, there has been developed such a communication navigation system that is designed not to perform the route search on the side of the communication navigation terminal, but to transmit information indicating a current position or an origin and a destination on the side of the communication navigation terminal, to perform the route search according to these by a high performance processor on the side of the communication center apparatus, to receive this search result at the communication navigation terminal, to display it in a predetermined format, and so on.

However, the above-described communication navigation system has the following disadvantage.

There is the possibility that it is impossible to have service of navigation in the area that an electric wave cannot arrive in with sufficient electric field intensity to use a wireless device. Usually, with respect to the display of the optimum route to the preset destination on a display map and the route navigation to the destination, the search for the optimum route and the like can be requested of the communication center apparatus through the communication network at home before leaving or on roads in residential area or in city centers. There is hardly any problem as long as information corresponding to the request from a user (it is referred to as "request correspondence information" in this specification), such as information indicating the optimum route, various information on facility guidance, travel guidance, and the like along the optimum route, and the like, can be obtained through the communication network from the communication center apparatus. However, after actual movement by a vehicle or the like and arrival to the destination, even if trying to search for the route to the next destination and the return route and trying to obtain the facility guidance and the travel guidance around that area, if this destination is out of the service area of the communication navigation system, any information cannot be obtained. This is not limited to the destination, but is the same as the case of trying to change a plan on a planned route. If the area in which this change is desired is out of the service area of the communication navigation system, any information cannot be obtained. Moreover, in the case of deviating from the planned route by some reasons such as losing the way, taking a side trip, and the like, if the area in which the fact is realized is out of the service area of the communication navigation system, again, any information cannot be obtained.

As described above, the communication navigation system causes unexpected disadvantage and inconvenience out of the service area of the communication navigation system, although it is extremely useful to reduce software load and hardware load at the communication navigation terminal mounted on a movable body.

Particularly, a movable body communication network is placed along expressways and main highways in many cases. Moreover, in the current situation, the infrastructure of a communication device such as a cellular phone or the like is not sufficiently promoted in mountain areas, and even in the future, it is difficult to think of the possibility to promote the infrastructure to cover all districts including depopulated areas, in the view of economic investment efficiency.

SUMMARY OF THE INVENTION

It is therefore an object of the present invention to provide a communication navigation system and a communication navigation method, which can restrain deterioration in function of navigation operation because of communication inability even if a movable body such as a vehicle or the like goes out of the service area of the communication navigation system, as well as a program storage device and a computer data signal embodiment in a carrier wave.

The above object of the present invention can be achieved by a first communication navigation system provided with a communication center apparatus and a communication terminal apparatus, both of which transmit and receive information by two-way communication through a communication network. The communication center apparatus is provided with: a processing device for generating request correspondence information including route information indicating a planned route corresponding to request information and generating, if at least one portion of the planned route is present out of a service area of the communication navigation system, announcement information for announcing that the at least one portion of the planned route is present out of the service area; and a center side communication device for receiving the request information and transmitting the request correspondence information and the announcement information through the communication network. The communication terminal apparatus is provided with a terminal side communication device for transmitting the request information and receiving at least the announcement information through the communication network; and an input device for inputting the request information and giving an opportunity of inputting the request information in response to the reception of the announcement information.

According to the first communication navigation system of the present invention, at the communication terminal apparatus provided with: a communication navigation terminal for a vehicle or the like which is mounted on a movable body; and a user terminal such as a cellular phone, a mobile, a facsimile, a personal computer, or the like, which is placed at the user's home or which is carried, the request information is firstly inputted by the input device and then this is transmitted by the terminal side communication device. Here, for example, the request of a search for an optimum route from a current position to a destination is regarded as the request information by designating the current position or an origin, stopping places, and the destination. Alternatively, in addition to or instead of this, the request of facility guidance, travel guidance, and the like along the optimum route may be inputted as the request information. Then, at the communication center apparatus, this request information is received by the center side communication device through the communication network. Moreover, the request correspondence information including route information indicating a planned route, which is, for example, the optimum route, corresponding to this request information is generated by the processing device. In this case, especially, if at least one portion of the planned route including, for example, a final destination, an intermediate destination, a stopping position, and the like, which is defined directly or indirectly by the request information, is present out of the service area of the communication navigation system, the announcement information for announcing this fact is generated by the processing device. For example, if the destination is out of the service area, the announcement information for announcing the indication that a return route (a homeward route) from the destination should be searched for or indicative of asking about the search for the return route is generated. Then, the request correspondence information and the announcement information are transmitted from the center side communication device.

Then, at the communication terminal apparatus, this announcement information is received by the terminal side communication device, and according to this reception of the announcement information, the input device further gives a user an opportunity of inputting the request information. In response to this, the request information is further inputted by the input device. Here, for example, if the destination is out of the service area, it becomes impossible to use the communication center apparatus through the communication network after arriving at the destination, so that the request information for requesting the search for an optimum return route heading home or the like from the destination, the search for the optimum route to a next destination from the destination, the facility guidance and the travel guidance around the destination, and the like, which are usually performed after the arrival at the destination, is further inputted by the input device according to the announcement information. Then, this request information is transmitted and received through the communication network.

Then, at the communication center apparatus, the request correspondence information corresponding to this further request information is generated and transmitted through the communication network. Therefore, the service through the communication network by the communication center apparatus, which cannot be received out of the service area, is received in advance by the communication terminal apparatus such as a terminal for users such as a personal computer or the like at home or the communication navigation terminal mounted on a movable body within the service area, and also if the movable body is present in an area which will be out of the service area later, this service can be used, which are extremely useful in practice.

On the other hand, in the case that all of the planned route corresponding to the request information is present within the service area of the communication navigation system, the announcement information is not generated, and the request correspondence information including the route information indicating the optimum route to the destination or the like is generated by the processing device and transmitted from the center side communication device. Receiving this, the communication terminal apparatus side becomes able to perform the typical navigation operation.

As described above, the first communication navigation system is provided with the communication terminal apparatus having the simple structure, and at the same time, even if the movable body goes out of the service area of the communication navigation system, it is intended to be able to reduce disadvantage possibly generated due to this fact, while having the communication center apparatus executed the functions of operation and search, such as map information, search functions, and the like, which have enormous volume data, which is advanced, and which require time.

In one aspect of the first communication navigation system of the present invention, the communication terminal apparatus is provided with a communication navigation terminal to be mounted on a movable body, the terminal side communication device receives the request correspondence information in addition to the announcement information, and the communication navigation terminal comprises an output device for outputting the received request correspondence information in a predetermined format.

According to this aspect, when the request correspondence information including the route information is received, this is outputted directly without change or after once stored in a RAM, a hard disk, and or the like, in the predetermined format by the output device, such as a display device, an audio output device, and the like, in response to actual traveling. For example, the optimum route and the current position of the movable body are displayed on a display map, and the navigation operation is preferably performed.

In another aspect of the first communication navigation system of the present invention, the communication terminal apparatus is provided with a terminal for users which is not mounted on a movable body, and the terminal side communication device receives the request correspondence information in addition to the announcement information.

According to this aspect, the communication terminal apparatus, which is a transmission source of the request information, is provided with the terminal for users such as a cellular phone, a mobile computer, a personal computer placed at home, or the like. When the request correspondence information including the route information, which is received in advance at the terminal for users before the movable body starts, is stored in a memory card or the like and brought into the movable body when starting, it becomes possible to incorporate it into the communication navigation terminal. Alternatively, it may be stored once in a hard disk of the terminal for users or the like, and then transmitted to the communication navigation terminal in the movable body through a wireless communication network before the movable body starts.

In another aspect of the first communication system of the present invention, the communication terminal apparatus is provided with a terminal for users which is not mounted on a movable body, the communication navigation system further comprises a communication navigation terminal mounted on a movable body and connected to the communication network, and the center side communication device transmits the request correspondence information to the communication navigation terminal.

According to this aspect, as for the transmission of the request information, it is performed in advance by the terminal for users such as a cellular phone, a mobile computer, a personal computer placed at home, or the like. The request correspondence information including the route information corresponding to this is transmitted to the communication navigation terminal mounted on the movable body which actually uses this information, which is useful.

In another aspect of the first communication navigation system of the present invention, if at least one portion of the planned route is present out of the service area, the processing device generates outer area information related to an area which is out of the service area in addition to the announcement information, and the center side communication device transmits the outer area information in addition to the announcement information.

According to this aspect, if at least one portion of the planned route is present out of the service area, not only the announcement information is transmitted, but also outer area information related to an area which is out of the service area, such as road information on within the area, the information for route search which enables the route search, the facility guidance and the travel guidance within the area, or the like, is generated and transmitted. Therefore, on the side of the communication terminal apparatus, even if the request information related to a certain area that is out of the service area is not further transmitted, it is possible to obtain in advance information substantial as the received outer area information or of at least certain degree. On that account, it becomes possible to respond on the basis of the outer area information without any help of the communication network even if the route search, facility guidance, the travel guidance, and the like are required when the movable body is present out of the service area later.

In another aspect of the first communication navigation system of the present invention, the processing device generates the request correspondence information including the route information indicating a return route from a destination designated by the received request information which is inputted with the input device in response to the reception of the announcement information.

According to this aspect, the request information inputted in response to the reception of the announcement information on the side of the communication terminal apparatus is transmitted. Then, on the side of the communication center apparatus, the route information indicating a return route from a destination designated be this received request information is generated as the request correspondence information by the processing device. Therefore, if the destination is out of the service area, such as in mountainous area, in plateau area, or the like, it is possible to prevent in advance such an undesired situation that it is turn out that the communication navigation system cannot be used when the return route is tried to search for. Moreover, according to the request correspondence information including the route information indicating the return route received in advance, the navigation operation with respect to the return route is also executed without problems.

Especially, in the present invention, an outward route and a homeward route are dared to be different in some cases, because of the relation among facilities and famous places to stop at in the middle of the route, scenery, the degree of congestion, and the like, and/or in the case that there are regulated roads such as one-way roads and the like. On that account, a simple operation regarding the outward route as the homeward route is basically not preferable. However, the information indicating that the homeward route may be the same as the outward route is also useful, and after confirming by the operation the fact that a route going backward the outward route may be used as the homeward route, this simply going-backward road can be regarded as the return route (the homeward route) as a result of searching.

Incidentally, when searching for the return route as described above, it is possible to search for one new optimum route different from the outward route, with the origin of the outward route as the destination and the destination of the outward route as the origin. Alternatively, it is also possible to search for one optimum route, with the outward route and the homeward route putted together, with the destination of the outward route as the stopping place as well as the destination as the destination. The latter reduces communication costs more because the communication completes at one time.

The above object of the present invention can be achieved by a second communication navigation system provided with a communication center apparatus and a communication terminal apparatus, both of which transmit and receive information by two-way communication through a communication network. The communication center apparatus is provided with a processing device for generating request correspondence information including route information indicating a planned route corresponding to request information and generating, if at least one portion of the planned route is present out of a service area of the communication navigation system, outer area information related to an area which is out of the service area; and a center side communication device for receiving the request information and transmitting the request correspondence information and the outer area information through the communication network. The communication terminal apparatus is provided with: a terminal side communication device for receiving the request correspondence information and the outer area information through the communication network; and a memory device for storing therein the outer area information.

According to the second communication navigation system of the present invention, at the communication center apparatus, request information indicating, for example, the search for the optimum route from the current position to the destination, the facility guidance, the travel guidance, and the like along the route, or the like is received by the center side communication device. Then, the request correspondence information including route information indicating a planned route, which is, for example, the optimum route, corresponding to this request information is generated by the processing device. In this case, especially, if at least one portion of the planned route including, for example, a final destination, an intermediate destination, a stopping position, and the like, which is defined directly or indirectly by the request information, is present out of the service area of the communication navigation system, the outer area information related to an area which is out of the service area, such as road information on within the area, the information for route search which enables the route search, the facility guidance and the travel guidance within the area, or the like, is generated and transmitted. In response to this, at the communication terminal apparatus, the outer area information is stored in the memory device such as a hard disk, a RAM, or the like. Therefore, on the side of the communication terminal apparatus, it is possible to obtain in advance information substantial as the outer area information as received above or of at least certain degree with respect to out of the service area. On that account, it becomes possible to respond on the basis of the outer area information without any help of the communication network even if the route search, facility guidance, the travel guidance, and the like are required when the movable body is present out of the service area later.

As described above, the service through the communication network by the communication center apparatus, which cannot be received out of the service area, is received in advance by the communication terminal apparatus such as a terminal for users such as a personal computer or the like at home or the communication navigation terminal mounted on a movable body within the service area, and also if the movable body is present in an area which will be out of the service area later, this service can be used, which are extremely useful in practice.

In addition, once the outer area information is obtained in advance as described above, even in the case of deviating from the planned route by some reasons such as losing the way, taking a side trip, and the like, it becomes possible to perform the route search to return to the planned route or perform a new route search to the destination, so that the user can feel relaxed to enter into the area in which the communication network cannot be used.

On the other hand, in the case that all of the planned route corresponding to the request information is present within the service area of the communication navigation system, the outer area information is not generated, and the request correspondence information including the route information indicating the optimum route to the destination or the like is generated by the processing device and transmitted from the center side communication device. Receiving this, the communication terminal apparatus side becomes able to perform the typical navigation operation.

As described above, the second communication navigation system is provided with the communication terminal apparatus having the simple structure, and at the same time, even if the movable body goes out of the service area of the communication navigation system, it is intended to be able to reduce disadvantage possibly generated due to this fact, while having the communication center apparatus executed the functions of operation and search, such as map information, search functions, and the like, which have enormous volume data, which is advanced, and which require time, In one aspect of the second communication navigation system of the present invention, the communication terminal apparatus comprises a communication navigation terminal to be mounted on a movable body, and the communication navigation terminal is provided with: an output device for outputting the received request correspondence information in a predetermined format; an input device for inputting the request information; and a generating device for generating the request correspondence information with respect to the request information related to the area which is out of the service area inputted from the input device on the basis of the outer area information stored in the memory device if the movable body is present out of the service area.

According to this aspect, when the request information is inputted by the input device at the communication navigation terminal, the processing identical or similar to that executed by the processing device on the side of the communication center apparatus is executed at the communication navigation terminal. Then the request correspondence information including the route information indicating the optimum route to the destination corresponding to this processing is outputted in the predetermined format by the output device such as a display device, an audio output device, and or the like, and the navigation operation is performed. Especially, in the case that the movable body is present out of the service area, when the request information related to the area which is out of the service area is inputted by the input device, the communication network is not used and the request correspondence information corresponding to this request information is generated by the generating device provided for the communication navigation terminal, on the basis of the outer area information stored in the memory device. Then, the request correspondence information generated in this manner is outputted in the predetermined format by the output device such as a display device, an audio output device, or the like, and the navigation operation is performed. Therefore, when the user inputs the request information without particular awareness of whether to be out of or within the service area, if within the service area, the navigation operation with the use of the communication network is performed, and if out of the service area, the navigation operation without the use of the communication network is performed, which is useful.

In another aspect of the second communication navigation system of the present invention, the communication terminal apparatus comprises a terminal for users which is not mounted on a movable body.

According to this aspect, the communication terminal apparatus, which receives the request correspondence information and the outer area information, is provided with the terminal for users such as a cellar phone, a mobile computer, a personal computer placed at home, or the like. When the request correspondence information in addition to the outer area information, which are received in advance at the terminal for users before the movable body starts, is stored in a memory card or the like as one example of the memory device and brought into the movable body when starting, it becomes possible to incorporate it into the communication navigation terminal. Alternatively, it may be stored once in a hard disk of the terminal for users or the like, and then transmitted to the communication navigation terminal in the movable body through a wireless communication network before the movable body starts.

Incidentally, in this case, this input device incapable of inputting the request information is preferably provided for the terminal for users.

In another aspect of the second communication navigation system of the present invention, the communication center apparatus further comprises a map database for storing therein map database information and the processing device generates the outer area information by extracting from the map database a portion related to the area which is out of the service area out of the map database information.

According to this aspect, the processing device can generate the outer area information relatively easily and quickly by extracting from the map database the map database information related to the area which is out of the service area.

In another aspect of the second communication navigation system of the present invention, the map database information includes at least one information out of map information, facility guidance information, travel guidance information, and meteorological information on each area which is divided into by predetermined unit.

By constituting in this manner, the processing device can generate the outer area information by extracting from the map database at least one information out of map information, facility guidance information, travel guidance information, and meteorological information related to the area which is out of the service area. Therefore, these can be used by the communication terminal apparatus out of the service area later as occasion demands.

In another aspect of the second communication navigation system of the present invention, the processing device generates the route information indicating a return route from a destination designated by the received request information or map information required to search for the route information indicating the return route as the outer area information.

According to this aspect, on the side of the communication center apparatus, the route information indicating a return route from a destination designated by the request information or the map information required to search for the route information indicating the return route is generated by the processing device as the outer area information. Therefore, if the destination is out of the service area, such as in mountainous area, in plateau area, or the like, it is possible to prevent in advance such an undesired situation that it is turn out that the communication navigation system cannot be used when the return route is tried to search for. Moreover, according to the route information indicating the return route received in advance or the map information required to search for the route information indicating the return route, the navigation operation with respect to the return route is also executed without problems.

In another aspect of the first or second communication system of the present invention, the communication center apparatus is provided with comprises a map database for storing therein map database information including information for route search which enables route search to a destination from a current position of a movable body by predetermined algorithm, and the processing device generates the route information by searching for a route heading to the destination from the current position by the predetermined algorithm, on the basis of the map database information and the received request information.

According to this aspect, the communication center apparatus is provided with the map database. This map database stores the large-scale map database information including the information for route search such as the above-described node information, link information, or the like, which enables a search for the optimum route from an origin to a destination by predetermined mathematical algorithm such as Dijkstra's algorithm and so on. Then, the optimum route with respect to the received request information is searched for by the processing device with the predetermined algorithm such as Dijkstra method or the like, on the basis of the information for route search included in this map database information. Then, the request correspondence information including the route information indicating the searched route is transmitted through the communication network. Therefore, there is no need to have the large-scale map database information including the information for route search such as the node information, the link information, or the like at the communication terminal apparatus, and further there is no need to perform large-scale search operation based on this at the communication terminal apparatus, so that it is possible to establish the effective communication navigation system as a whole.

In another aspect of the first or second communication navigation system, the communication center apparatus further comprises a map database for storing therein map database information including service area information indicating whether each area is present out of or within the service area, and the processing device determines whether or not at least one portion of the planned route is present out of the service area, on the basis of the service area information.

According to this aspect, it can be determined quickly and easily whether or not at least one portion of the planned route is present out of the service area, on the basis of the map database information including the service area information. Then, according to this determination result, if it is present out of the service area, the outer area information is generated and is served as later use.

The above object of the present invention can be achieved by a communication center apparatus included in the above described first or second communication navigation system (including its various aspects).

According to the communication center apparatus of the present invention, the use of this with the communication network and the communication terminal apparatus associated with the present invention as described above can establish the above described first or second communication navigation system of the present invention.

The above object of the present invention can be achieved by a first communication navigation method in a communication navigation system provided with a communication center apparatus and a communication terminal apparatus, both of which transmit and receive information by two-way communication through a communication network. The communication navigation method is provided with: (i) at the communication center apparatus, a generating process of generating request correspondence information including route information indicating a planned route corresponding to request information and generating, if at least one portion of the planned route is present out of a service area of the communication navigation system, announcement information for announcing that the at least one portion of the planned route is present out of the service area; and a center side communication process of receiving the request information and transmitting the request correspondence information and the announcement information through the communication network, and (ii) at the communication terminal apparatus: a terminal side communication process of transmitting the request information and receiving at least the announcement information through the communication network; and an inputting process for inputting the request information and giving an opportunity of inputting the request information in response to the reception of the announcement information.

According to the first communication navigation method of the present invention, as is the case with the above described first communication navigation system of the present invention, even if the movable body goes out of the service area of the communication navigation system, it is possible to reduce disadvantage possibly generated due to this fact. In addition, the various aspects which are described above may be combined with this method.

The above object of the present invention can be achieved by a second communication navigation method executed in a communication navigation system provided with a communication center apparatus and a communication terminal apparatus, both of which transmit and receive information by two-way communication through a communication network. The communication navigation method is provided with: (i) at the communication center apparatus, a generating process of generating request correspondence information including route information indicating a planned route corresponding to request information and generating, if at least one portion of the planned route is present out of a service area of the communication navigation system, outer area information related to an area which is out of the service area; and a center side communication process of receiving the request information and transmitting the request correspondence information and the outer area information through the communication network, and (ii) at the communication terminal apparatus: a terminal side communication process of receiving the request correspondence information and the outer area information through the communication network; and a storing process of storing therein the outer area information.

According to the second communication navigation method of the present invention, as is the case with the above described second communication navigation system of the present invention, even if the movable body goes out of the service area of the communication navigation system, it is possible to reduce disadvantage possibly generated due to this fact. In addition, the various aspects which are described above may be combined with this method.

The above object of the present invention can be achieved by a program storage device readable by a computer for tangibly embodying a program of instructions executable by the computer to perform the first or second communication navigation method described above. In addition, the various aspects which are described above may be combined with this method.

According to the program storage device, such as a CD-ROM (Compact Disc-Read Only Memory), a DVD-ROM (DVD Read Only Memory), a hard disk, a floppy disk or the like, of the present invention, the communication center apparatus associated with the present invention can be relatively easily realized as a computer reads and executes the program of instructions or as it executes the program after downloading the program through a communication device.

The above object of the present invention can be achieved by a computer data signal embodied in a carrier wave and representing a series of instructions which cause a computer to perform the first or second communication navigation method described above. In addition, the various aspects which are described above may be combined with this method.

According to the computer data signal embodied in the carrier wave of the present invention, as the computer downloads the program in the computer data signal through a computer network or the like, and executes this program, it is possible to realize the communication center apparatus for providing map information associated with the present invention.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Referring to the accompanying drawings, embodiments associated with a communication navigation system and a communication navigation method, a program storage device, and a computer data signal embodiment in a carrier wave of the present invention will be now explained. Incidentally, each embodiment, which will be described below, is intended to establish the communication navigation system of the present invention as a system that can perform the navigation operation even out of the service area of the communication navigation system, by an on-vehicle communication navigation terminal.

(I) First Embodiment

Figure 1:
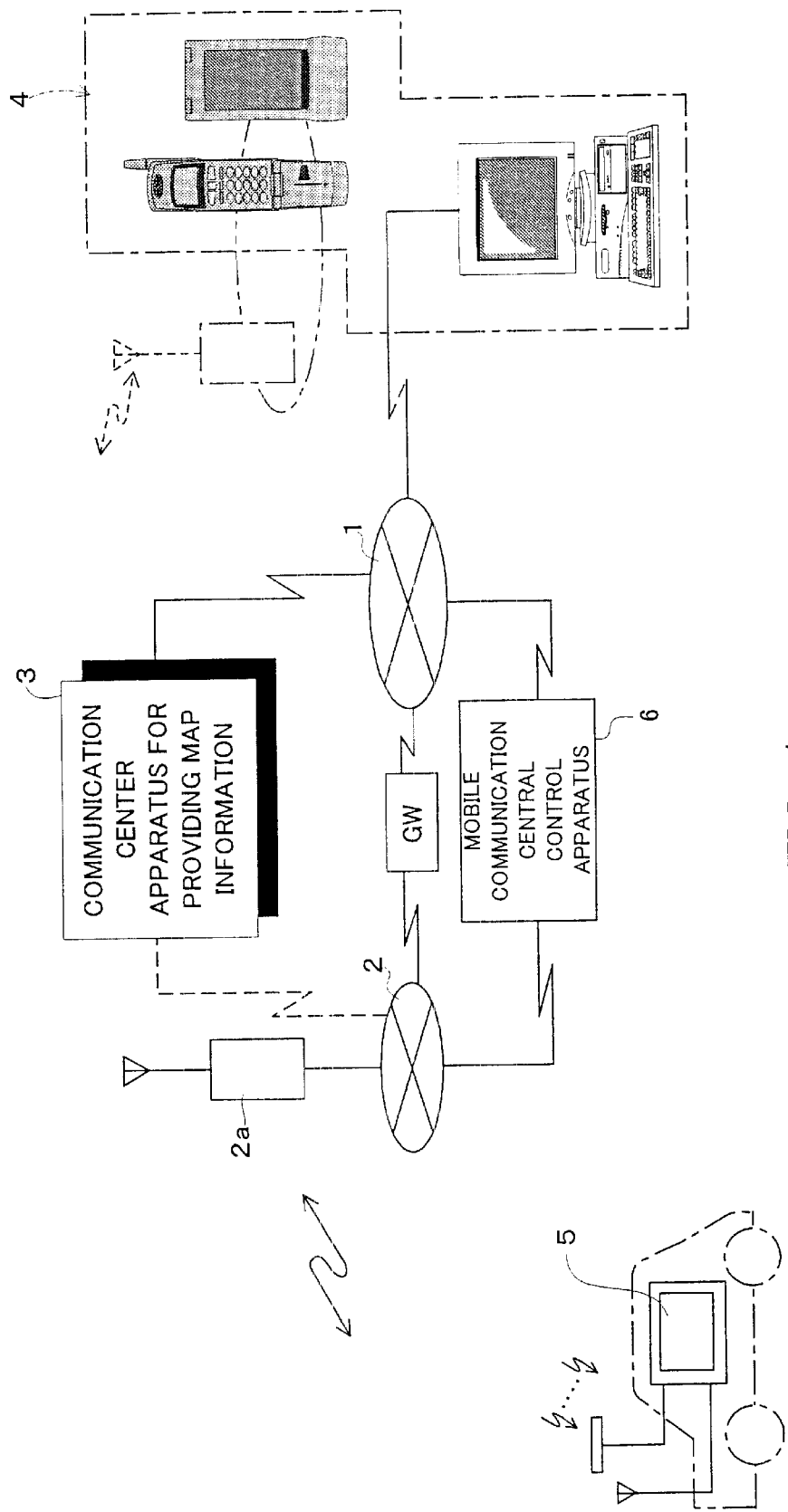
FIG. 1 is a block diagram showing the whole structure of a communication navigation system in a first embodiment of the present invention.

Firstly, the whole structure of the communication navigation system in the first embodiment will be explained with reference to FIG. 1. FIG. 1 is a block diagram showing the whole structure of the communication navigation system in the first embodiment.

In FIG. 1, a digital fixed communication circuit network 1 and a digital mobile communication network 2 (hereunder, the two communication networks are collectively referred to as a communication circuit network as occasion demands), both of which are connected with a gateway (GW) device for communication protocol conversion, are provided in the first embodiment. On this communication circuit network, IP (Internet Protocol) packet communication is performed under TCP/IP (Transmission Control Protocol/Internet Protocol) environment (e.g. the Internet).

The digital fixed communication circuit network 1 is connected to a communication center apparatus 3, a personal computer and the like. The communication center apparatus 3 is owned by communication navigation companies, for example. The personal computer is installed at a user's home. This personal computer is one example of a communication terminal 4 for users.

At a cell base station 2a of the digital mobile communication network 2, a cellular phone, a mobile or hand-carry type information terminal/PDA (Personal Digital Assistants), and the like are accommodated through a wireless section (air interface). An on-vehicle communication navigation terminal 5 mounted on the user's vehicle is accommodated through the air interface. Incidentally, the cellular phone, and the mobile or hand carry type information terminal/PDA are other examples of the communication terminal 4.

The communication center apparatus 3 is constructed to perform maintenance and preservation, which have been traditionally performed at an on-vehicle navigation apparatus, of the newest map database information including the map information for display of various scales, the information for route search, and the like, which will have enormous data volume. Moreover, it is designed to perform the search processing of the optimum route, whose load of processing is heavy, in place of the on-vehicle navigation apparatus.

The communication terminal 4 is constructed to request the communication center apparatus 3 to provide the map information, to search for the optimum route, and so on. Moreover, it is constructed to give instructions of where to transmit the requested map information or the like. Incidentally, the request and the instruction of where to transmit described above can be performed from the communication navigation terminal 5 in the same manner as those from the communication terminal 4.

The communication navigation terminal 5 is for vehicle use. The communication navigation terminal 5 downloads the map information that is minimally required for display from among the map database information of the communication center apparatus 3 at least when displaying a map during a navigation operation. The communication navigation terminal 5 is equipped with a recording medium, such as a CD, a DVD, or the like, and stores the downloaded map information for display onto such a recording medium. Then, along with displaying the road map by using the downloaded map information, the communication navigation terminal 5 displays the optimum route to a destination, a location of a vehicle, a moving direction, scale circle/radius, a driving locus, a map direction or orientation, and the like.

The communication center apparatus 3, the communication terminal 4, and the communication navigation terminal 5 are equipped with a communication application program (for example, including Web browser), which will be explained in detail later.

Especially, in the first embodiment, there is accommodated a mobile communication central control apparatus 6 for prestoring information on an inner service area (a communicable area of the cell base station) and an outer service area in a mobile communication network as, for example, the coordinates information and providing it for the communication center apparatus 3. The mobile communication central control apparatus 6 is, more concretely, a generic apparatus of, for example, a mobile communication control station (MCC) for accommodating plurality of cell base stations, and it collects a position information D/B device of a cellular phone, charging information, and the like. Here, this mobile communication central control apparatus 6 is assumed to store service area information of the cell base station.

Incidentally, if there are plurality of mobile communication carriers, the mobile communication central control apparatus 6 provides the respective information on of the inner and outer service areas. Namely, there are installed plurality of mobile communication central control apparatuses 6, which are not drown in FIG. 1, for each the mobile communication carrier. Incidentally, it is also possible to construct such that the plurality of mobile communication center control apparatuses 6 for each mobile communication carrier are integrated on the communication network by a communication connection (link). Moreover, it is possible to construct such that the apparatuses themselves are integrated.

Incidentally, the communication network in FIG. 1 is not especially limited to the TCP/IP method, and various data communication methods are available. It also allows the use of an analog fixed communication circuit network instead of the digital fixed communication circuit network 1.

Figure 2:
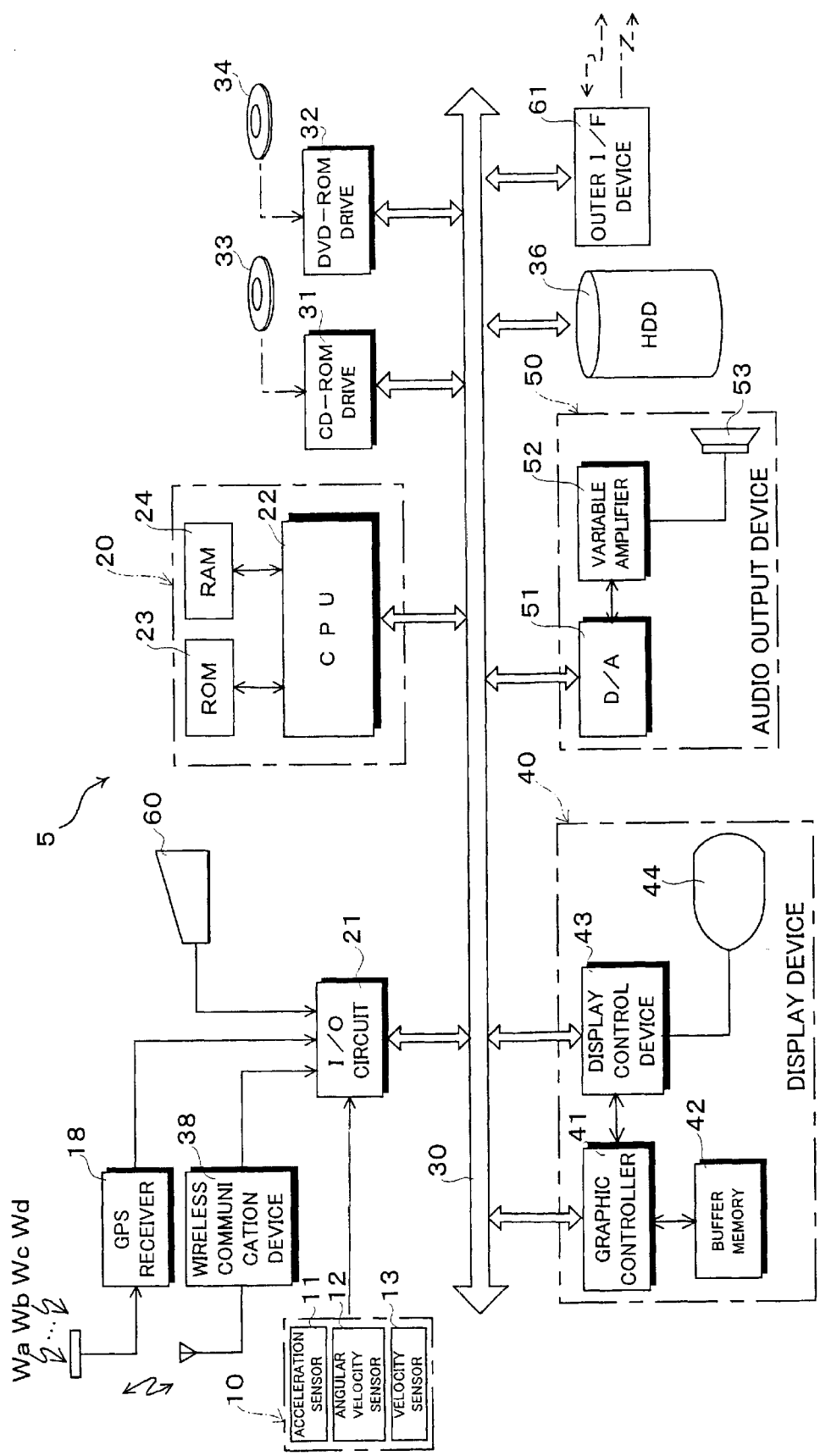
FIG. 2 is a block diagram showing an example of the inner structure of a communication navigation terminal shown in FIG. 1 in the first embodiment.

Next, the communication navigation terminal 5 shown in FIG. 1 will be further explained with reference to FIG. 2. FIG. 2 is a block diagram showing an example of the inner structure of the communication navigation terminal shown in FIG. 1.

In FIG. 2, this communication navigation terminal 5 is provided with a self-contained positioning apparatus 10, a GPS receiver 18, a system controller 20, an input and output (I/O) circuit 21, a CD-ROM drive 31, a DVD-ROM drive 32, a hard disk device (HDD) 36, a wireless communication device 38, a display device 40, an audio output device 50, an input device 60, and an outer interface (I/F) device 61. Each component is connected to a bus line 30 for communicating processing data and control data.

The self-contained positioning apparatus 10 is constructed by an acceleration sensor 11, an angular velocity sensor 12, and a velocity sensor 13. The acceleration sensor 11, which is constructed by a piezoelectric element, for example, outputs acceleration data obtained by detection of the acceleration of a vehicle. The angular velocity sensor 12, which is constructed by a vibration gyro, for example, outputs angular velocity data and relative azimuth data obtained by detection of the angular velocity of a vehicle when the vehicle changes its moving direction. The velocity sensor 13 detects the rotation of a vehicle shaft mechanically, magnetically, or optically and outputs signals of the number of pulses corresponding to a vehicle speed at every rotation for a predetermined angle around a vehicle shaft.

The GPS receiver 18 has a known structure, provided with a microprocessor unit (MPU) or a digital signal processor (DSP), a control device, a V-RAM, other memory devices and the like, as well as a high frequency reception processing device and a plane polarization non-directional receiving antenna. The GPS receiver 18 is constructed to receive electric waves Wa to Wc (when desired to obtain more reliable values, four electric waves Wa to Wd) from at least three GPS satellites placed into orbit around the earth, to perform back-diffusion of spectra, distance measurement, Doppler measurement, and orbital data processing, and to continuously output absolute position information of a reception position (a driving position of a vehicle) from the I/O circuit 21 to the bus line 30 after calculation of a moving velocity/azimuth and that of a location. The system controller 20 incorporates and displays it on the map road.

The system controller 20 is constructed by a CPU (Central Processing Unit) 22, a ROM (Read Only Memory) 23, which is a non-volatile solid storage element, and a RAM (Random Access Memory) 24 for working. The system controller 20 performs data communication with each component connected to the bus line 30. The data communication processing is executed by a control program and a boot program stored in the ROM 23. The RAM 24 temporarily stores setting information, which changes map display (changes it to a full-scale or local map display) by the user's operation from the input device 60, especially.

The CD-ROM drive 31 and the DVD-ROM drive 32 read out from a CD-ROM 33 and a DVD-ROM 34 and output the map database information (e.g. various road data, such as a road width, the number of traffic lanes, or the like, on map information (drawings)), which is stored in both the CD-ROM 33 and the DVD-ROM 34.

Incidentally, it is possible to install either one of the CD-ROM drive 31 and the DVD-ROM drive 32, and it is also possible to install one compatible drive.

The hard disk device 36 can store map (image) data, which are read by the CD-ROM drive 31 or the DVD-ROM drive 32, and after this storing, it can read out them at an arbitrary time. The hard disk device 36 can further store video data and audio data, both of which are read by the CD-ROM drive 31 and the DVD-ROM drive 32. Because of this, for example, it becomes possible to read out the video data and the audio data stored in the hard disk device 36 and output them as video and as sound, while reading out the map data on the CD-ROM 33 and the DVD-ROM 34 to perform the navigation operation. Alternatively, it becomes possible to read out the map data stored in the hard disk device 36 to perform the navigation operation, while reading out the video data and the audio data on the CD-ROM 33 and the DVD-ROM 34 and outputting them as video and as sound. Moreover, it becomes possible to output by storing in the hard disk device 36 the map data, the video data, or the audio data, which are downloaded by the wireless communication device 38, and then reading out them at an arbitrary time.

The wireless communication device 38 has the same structure as that of a general-purpose cellular phone, which is known as TDMA, TDD, or CDMA structure (a high-frequency wireless transmitting/receiving device, an encoding/decoding device, a time division multiplexing device, a control device, an audio input/output device, and the like) in the manner of PDC (Personal Digital Cellular Telecommunication System) or PHS (Personal Handyphone System), for example.

The display device 40 displays various processing data under the control of the system controller 20. A graphic controller 41 inside the display device 40 controls each component of the display device 40 on the basis of the control data transmitted from the CPU 22 through the bus line 30. Moreover, a buffer memory 42 using the V-RAM or the like temporarily memorizes immediately-displayable image information. Furthermore, along with a display control device 43 controlling display, a display 44, which is constructed by a liquid crystal display (LCD), an EL (Electro-Luminescence), or a CRT (cathode-ray tube), displays the image data outputted from the graphic controller 41. This display 44 is installed in the vicinity of a front panel in a vehicle, for example.

At the audio output device 50, a variable amplifier (AMP) 52 variably amplifies an audio analog signal outputted from a D/A converter 51 and outputs it to a speaker 53, from which it is outputted as sound, with the D/A converter 51 converting into a digital signal an audio signal transmitted through the bus line 30 under the control of the system controller 20.

The input device 60 is provided with a key, a switch, a button, a remote controller, an audio input device, and so on, to input various types of commands and data. The input device 60 is installed in the vicinity of the display 44 or a front panel of a main body of the communication navigation terminal loaded into a vehicle.

Incidentally, the communication navigation terminal 5 is not limited to the above-described structure. For example, the GPS receiver 18 is built in the communication navigation terminal 5 and is wired and connected to the I/O circuit 21; however, it is also possible to employ such a structure that a general-purpose mobile or hand-carry type GPS receiver is wired and connected (interface connected) to the outer I/F device 61 or such a wireless connection manner that allows the installation of a weak radio transmitting receiving device (e.g. Bluetooth frequency hopping communication manner) at the outer I/F device 61 and the general-purpose mobile or hand-carry type GPS receiver.

In the same manner as the GPS receiver 18 does, the wireless communication device 38 can also employ such a structure that a general-purpose mobile or hand-carry type cellular phone is wired and connected (interface connected) to the outer I/F device 61 or such a wireless connection manner that allows the installation of a weak radio transmitting/receiving device at the outer I/F device 61 and the general-purpose mobile or hand-carry type cellular phone.

Moreover, the input device 60 can also employ an infrared ray remote control manner and/or the same weak radio transmission/reception manner as those of the wireless communication device 38 and the GPS receiver 18. The infrared ray remote control manner is designed such that it uses a remote controller to perform infrared ray remote manipulation by user's hands, with an infrared ray reception device and a decoder built in the communication navigation terminal 5 (in general, they are installed in the vicinity of the display 44).

Figure 3:
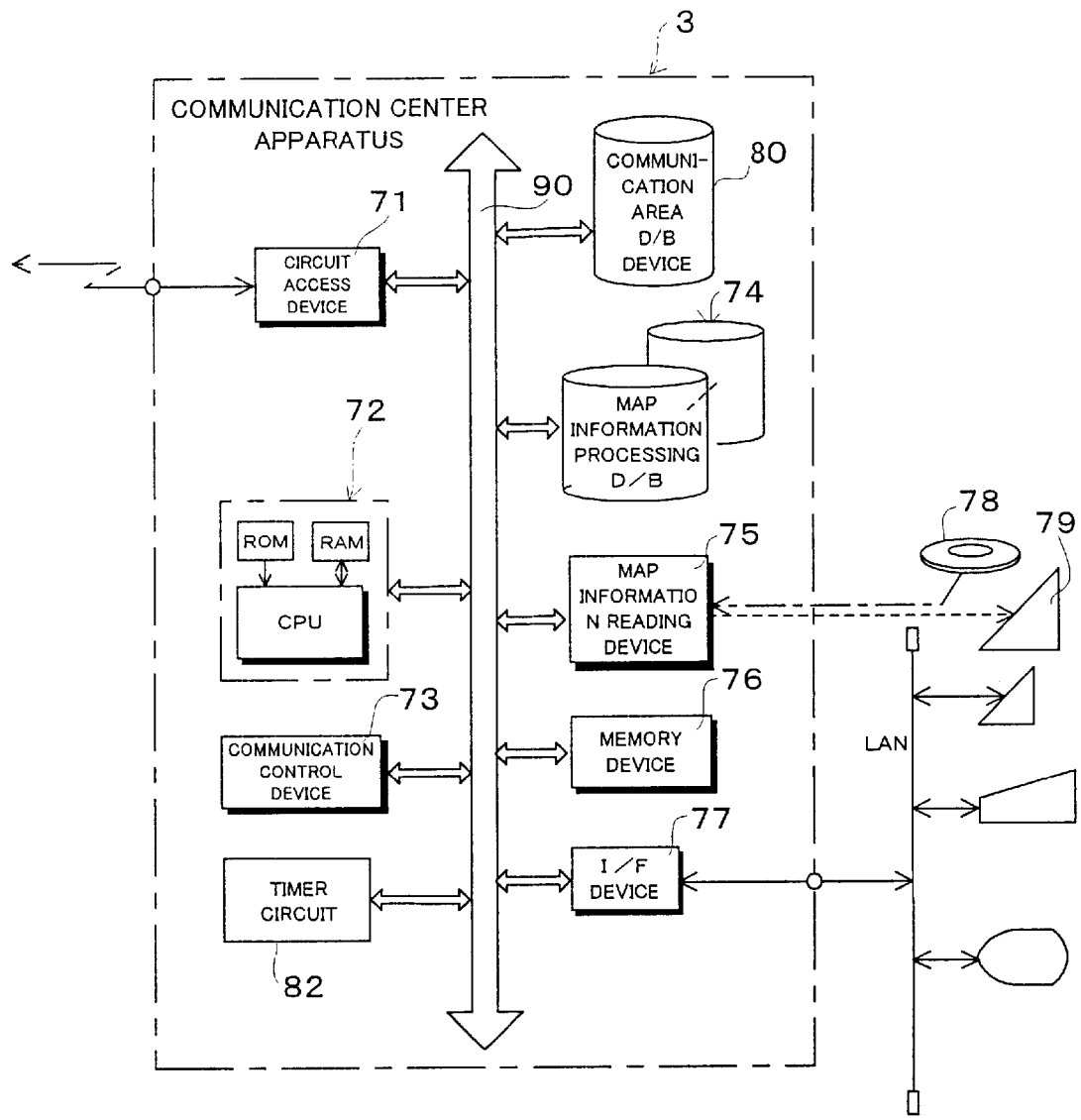
FIG. 3 is a block diagram showing an example of the inner structure of a communication center apparatus shown in FIG. 1 in the first embodiment.

Next, the communication center apparatus 3 shown in FIG. 1 will be further explained with reference to FIG. 3. FIG. 3 is a block diagram showing an example of the inner structure of the communication center apparatus 3.

In FIG. 3, this communication center apparatus 3 is provided with a circuit access device 71, a microprocessor 72, a communication control device 73, a map information processing database device 74, a map information reading device 75, a memory device 76, an interface (I/F) device 77, a DVD-ROM 78 (a CD-ROM is also available), a communication terminal 79, a communication area (district) D/B device 80, a timer circuit 82, and a bus line 90.

The circuit access device 71 is intended to accommodate the communication center apparatus 3 in the digital fixed communication circuit network 1, and it is provided with a DSU (Digital Service Unit), which is a terminating device, a router, a firewall, and the like, for example. Incidentally, the circuit access device 71 is equipped with a network control unit (NCU), a modulator-demodulator (modem), and the like in the case of using an analog fixed communication circuit network instead of the digital fixed communication circuit network 1 in FIG. 1.

The microprocessor 72 is provided with a ROM, a working RAM, and a CPU. The microprocessor 72 controls each component of the communication center apparatus 3 on the basis of a program, and its control data and processing data are exchanged through the bus line 90. The microprocessor 72 further works with the map information processing database device 74 to execute various data processing such as the search processing of the optimum route or the like, which will be explained later.

The communication control device 73 works with the circuit access device 71 to execute communication protocol with the communication circuit network. For example, it executes TCP/IP.

The map information processing database device 74 stores the map database information including the map information for display of various scales, the information for route search constructed by the link information, the node information, and the like, which have enormous data volumes and which cover road networks spread in a broad area such as throughout Honshu or the main island of Japan or throughout Japan and so on. Moreover, the map information processing database device 74 uses this map database information to execute data processing, such as the search processing of the optimum route or the like, with the microprocessor 72.

The map information reading device 75 operates as a drive, which reads out the map database information from the CD-ROM or DVD-ROM 78. The map database information from the CD-ROM or DVD-ROM 78 is transmitted to and stored in the map information processing database device 74 through the bus line 90. The map database information at the map information processing database device 74 is updated by reading out data from the CD-ROM or DVD-ROM 78, which stores the newest map database information.

The memory device 76 holds information on setting an apparatus and a variable in control processing of the microprocessor 72 transmitted through the bus line 90.

The I/F device 77 accommodates an outer LAN (Local Area Network) to execute information processing and maintenance of various types such as replacement of the map database information at the map information reading device 75.

The communication terminal 79 is intended to incorporate the map database information instead of the CD-ROM or DVD-ROM 78. For example, it is intended to download (receive) on-line the map database information provided from a map information preparing company or association to install it in the map information processing database device 74. Therefore, the map database information at the map information processing database device 74 may be updated through the communication terminal 79.

The communication area (district) D/B device 80 pre-stores information on a communicable area (the service area of the cell base station) and an incommunicable area on the mobile communication network incorporated from the mobile communication central control apparatus 6 as, for example, the coordinates information.

The timer circuit 82 is intended to measure a time point to transmit to the communication terminal 4 the map information in which a searched route is matched on roads and the like.

Incidentally, in the case that this communication center apparatus 3 is used as the Internet, it will be a portal site structure. For example, it is provided with a Web server, a FTP (File Transfer Protocol) file transmitting server, a DNS (Domain Name System) server, a FAX/e-mail server, and so on.

A cellular phone as the communication terminal 4 shown in FIG. 1 also has a structure known as the PDC manner and the PHS manner (TDMA, TDD, or CDMA). The PDA or a compact general-purpose computer as the communication terminal 4 also has a familiar structure and performs familiar operations, and each detailed explanation will be omitted. The cellular phone as the communication terminal 4 is equipped with an application (an exclusive browser) for browsing contents of exclusive HTML (Hypertext markup language) tag description, which is accessible to the Internet. Moreover, the PDA or the compact general-purpose computer is also equipped with an application (browser/mailer application program) accessible to the Internet, which is a known structure.

Especially in the first embodiment having the structure described with reference to FIG. 1 to FIG. 3, the communication center apparatus 3 performs the route search, which has been traditionally performed inside the on-vehicle navigation apparatus by the microprocessor 72 and the map information procession D/B device 74. Then, it provides the communication navigation terminal with the route information including the optimum route to have been obtained as the result of the route search.

The communication terminal 4 is constructed to give instructions of where to transmit the route information as well as requesting the route search of the communication center apparatus 3. Incidentally, these kinds of route search requests and instructions of where to transmit can be performed from the communication navigation terminal 5 in the same manner as those from the communication terminal 4.

The communication navigation terminal 5 uses the route information wirelessly transmitted from the communication center apparatus 3 to perform route display on a map road. Moreover, at the communication navigation terminal 5, it is also possible to perform route guidance of right turn, left turn, straight advance, or the like at each guidance position according to the route guidance information on the each guidance position on the route to be transmitted with the route information. With respect to the route guidance information in this kind, it is not necessary to wirelessly transmit it with the route information. It is also possible to otherwise reproduce the route guidance information in this kind on the basis of the route information to have received on the side of the communication navigation terminal 5.

Especially in this embodiment, the map information processing database device 74 of the communication center apparatus 3 stores the map database information whose data volume is enormous and which includes a wider variety of information than the map data stored in the CD-ROM 33, the DVD-ROM 34, the HDD 36, or the like of the communication navigation terminal 5. Namely, the map database information includes the information for route search constructed by the link information, the node information, and the like, which cover road networks spread in a broad area such as throughout Honshu or the main island of Japan or throughout Japan and so on. The map database information further includes the map information for display of various scales. Moreover, the map database information includes data of added information, for example, such as map scales, guidance information of tourist attractions/facilities, facility numerals and the name (characters) of maps/roads, views of waters/railroads, and roads, on each map. Among them, especially the information for route search enables the route search based on the predetermined mathematical algorithm such as Dijkstra's algorithm or the like, and its data volume becomes enormous.

Furthermore, the search processing, which has the heavy load of processing based on the information for route search having this enormous data volume, is not performed on the side of the communication navigation terminal 5 but is executed on the side of the communication center apparatus 3 by the map information processing database device 74 and the microprocessor 72.

As described above, the CD-ROM 33, the DVD-ROM 34, the HDD 36, and the like of the communication navigation terminal 5 do not store the information for route search whose data volume is enormous, and their memory capacities are far smaller than that necessary for the map information processing database device 74, which is advantageous in view of simplifying the communication navigation terminal 5. Moreover, the route search based on the information for route search is not executed on the side of the communication navigation terminal 5, which causes the light load of processing in the system controller 20, so that it is again advantageous in view of simplifying the communication navigation terminal 5. Furthermore, the route information is wirelessly transmitted as a result of the route search, and the information for route search or the like, which has an enormous data volume, is not wirelessly transmitted, so that it is extremely advantageous in view of reducing the volume of data to be transmitted and received and in view of relatively low capacities of transmission and reception at the communication center apparatus 3 and the communication navigation terminal 5.

The data processing in the first embodiment, as designed above, and in another embodiment, as will be described later, is executed mainly by the CPU 22 of the communication navigation terminal 5 shown in FIG. 2 and the microprocessor 72 and the map information processing database device 74 of the communication center apparatus 3 shown in FIG. 3. More concretely, in addition to a computer program for controlling basic operations in the navigation system such as display of a current position, display of a map, or the like, a computer program associated with display control of the optimum route based on the route information received from the communication center apparatus 3, transmission control of the route search request for the communication center apparatus 3, or the like is executed by the CPU 22 of the communication navigation terminal 5 shown in FIG. 2. On the other hand, a computer program associated with search control of the optimum route, reception control of the route search request, or the like is executed by the microprocessor 72 and the map information processing database device 74 of the communication center apparatus 3 shown in FIG. 3. The computer program executed at the CPU 22 may be stored in a built-in memory device such as a RAM 24 or the like in the system controller 20 shown in FIG. 2, and it may be what is downloaded through the wireless communication device 38 or the like. On the other hand, the computer program executed at the microprocessor 72 and the map information processing database device 74 may be stored in the memory device 76, the DVD-ROM 78, or the like shown in FIG. 3, and it may be what is downloaded through the circuit access device 71, the communication terminal 79, or the like.

Figure 4:
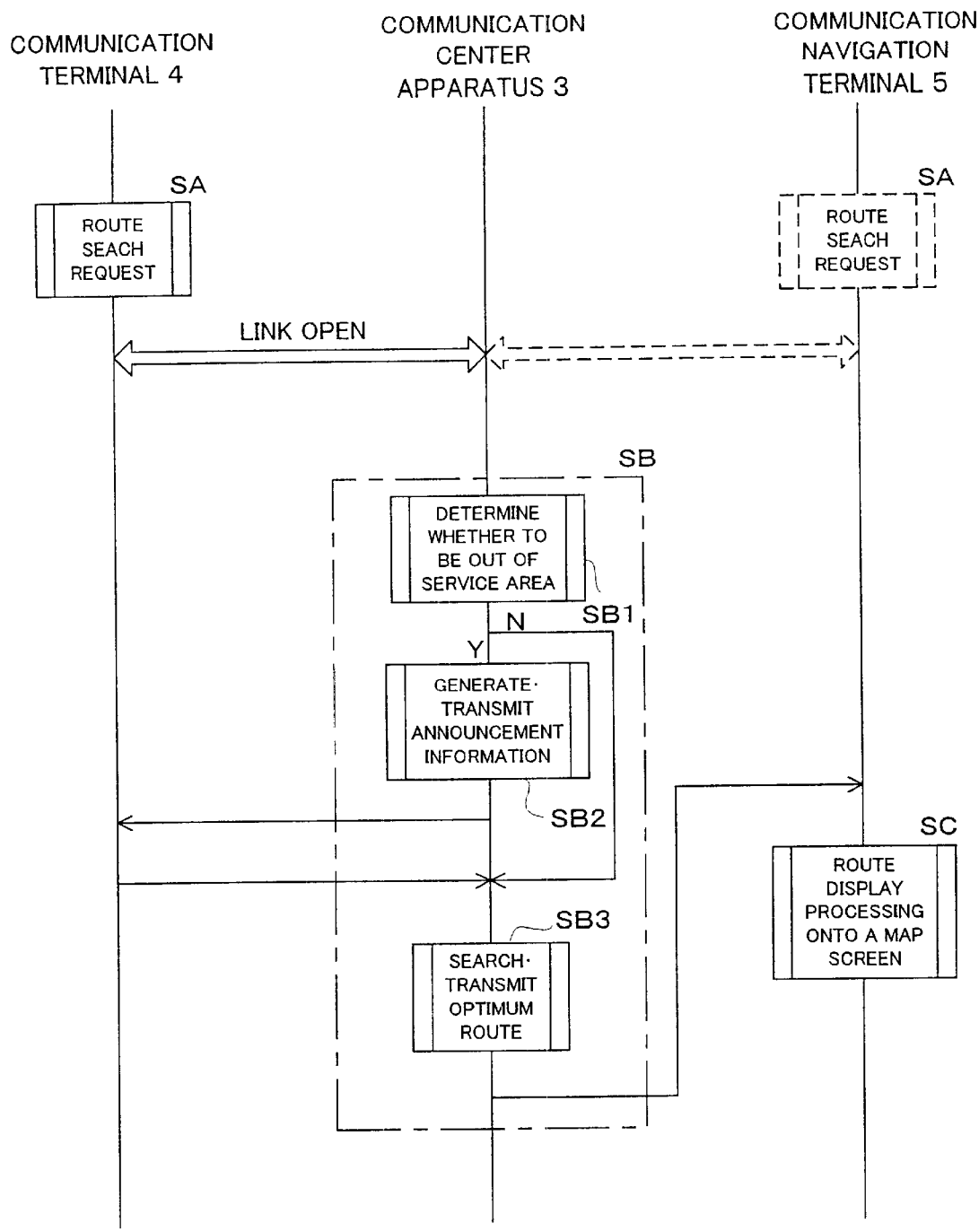
FIG. 4 is a sequence chart of transmission on a communication network in the first embodiment.

Next, the outline of all operations in the communication navigation system in the first embodiment as constructed above will be explained with FIG. 4 in addition to FIG. 1 to FIG. 3. FIG. 4 is a sequence chart of transmission on a communication network in the first embodiment.

In FIG. 1 to FIG. 4, the route search request for an origin and a destination (and further one or more stopping places or intermediate destinations if needed) from the communication terminal 4 is firstly performed (step SA). Incidentally, this route search request can be performed from the communication navigation terminal 5 (hereinafter, the specification only from the communication terminal 4 will be explained).

Secondly, as soon as the communication center apparatus 3 receives this route search request information, it executes a search for the optimum route corresponding to the route search request information (step SB). In other words, the communication center apparatus 3 performs the route search, which is typically performed by each navigation apparatus, and transmits to the communication navigation terminal 5 the map information in which the searched route is matched on roads by wireless transmission through a wireless communication circuit network (the digital mobile communication network 2). In reality, the communication center apparatus 3 transmits the map D/B information with various added data as well as the map information in which the searched route is matched.

Especially in the first embodiment, in searching for the optimum route in step SB, it is firstly determined whether or not the destination included in the received route search request information is included in the outer service area (step SB1). Then, if included in the inner service area (step SB1: No), the communication center apparatus 3 remains in searching for the optimum route and transfers to the communication navigation 5 (or the communication terminal 4) the map D/B information including the searched route to have been searched for (step SB3).

In contrast, if the destination is included in the outer service area (step SB1: Yes), the communication center apparatus 3 transfers to the communication terminal 4 announcement information indicating the fact with questions about necessity of searching for a homeward route and the like (step SB2). At the terminal apparatus 4, a user requests the route search again, considering the necessity of searching for a homeward route. Then, the communication center apparatus 3 performs the optimum route search corresponding to this route search request information and transfers the map D/B information including the searched route to the communication navigation terminal 5 (or the communication terminal 4) (step SB3).

Then, the communication navigation terminal 5, which has received the map D/B information including this searched route, sequentially screen-displays the current position of the self-car as well as the optimum route of the origin and the destination with thick lines and dashed lines of specific colors on roads on a map (step SC)

Figure 5:
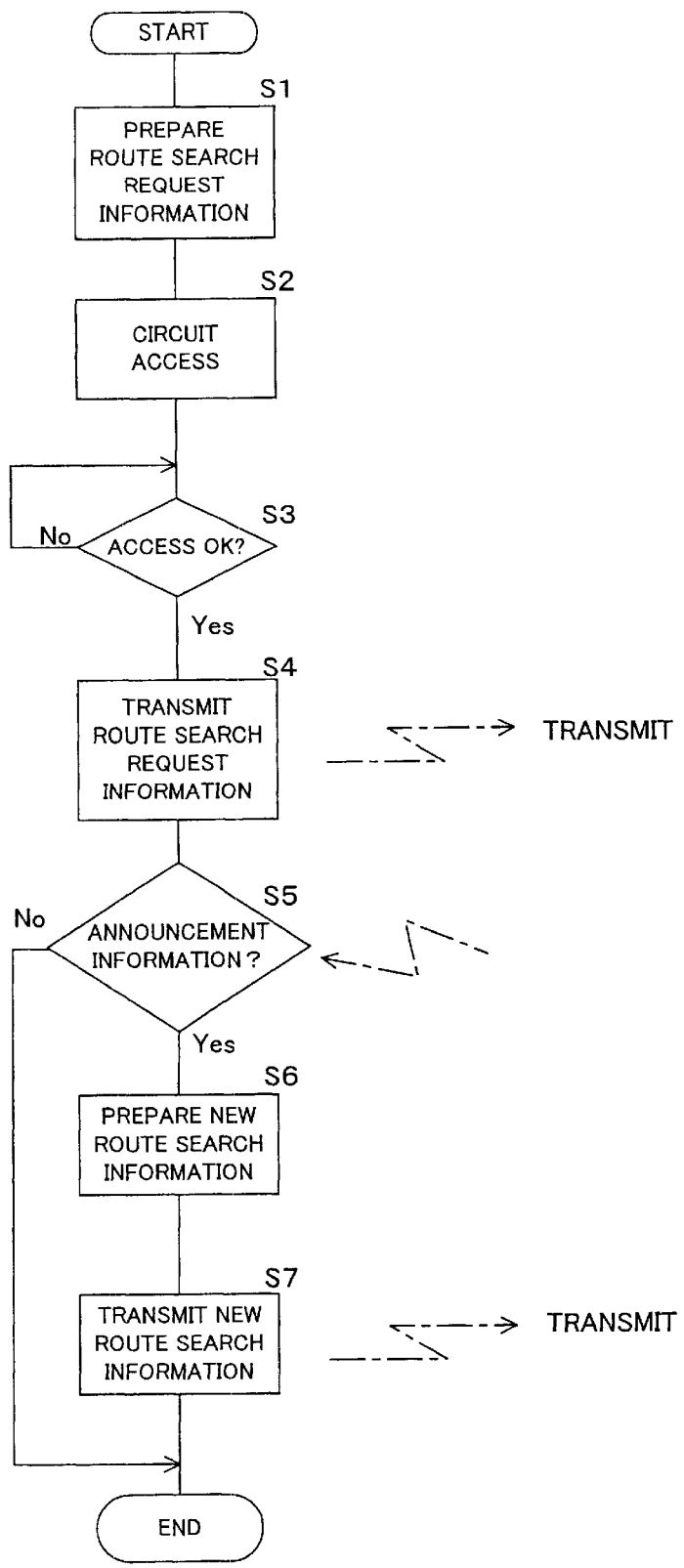
FIG. 5 is a flow chart showing processing procedures of route search request at a terminal apparatus in the first embodiment.
Figure 6A:
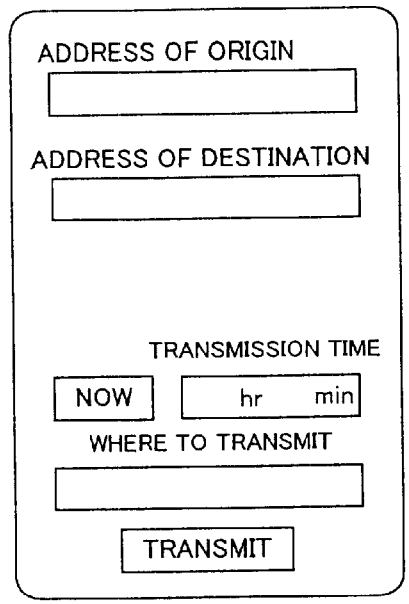
FIG. 6A and FIG. 6B are schematic diagrams to explain window screens of route search request in the first embodiment.
Figure 6B:
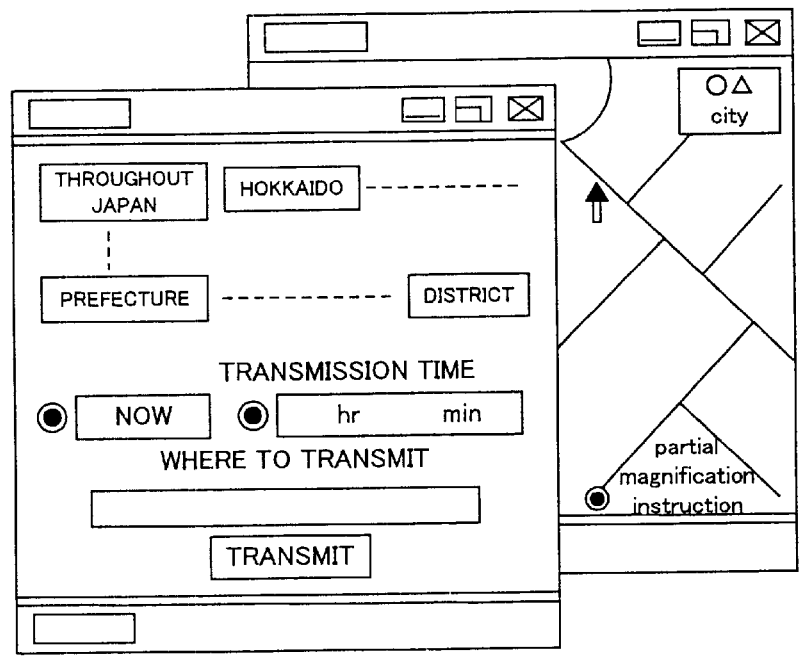
Figure 7:
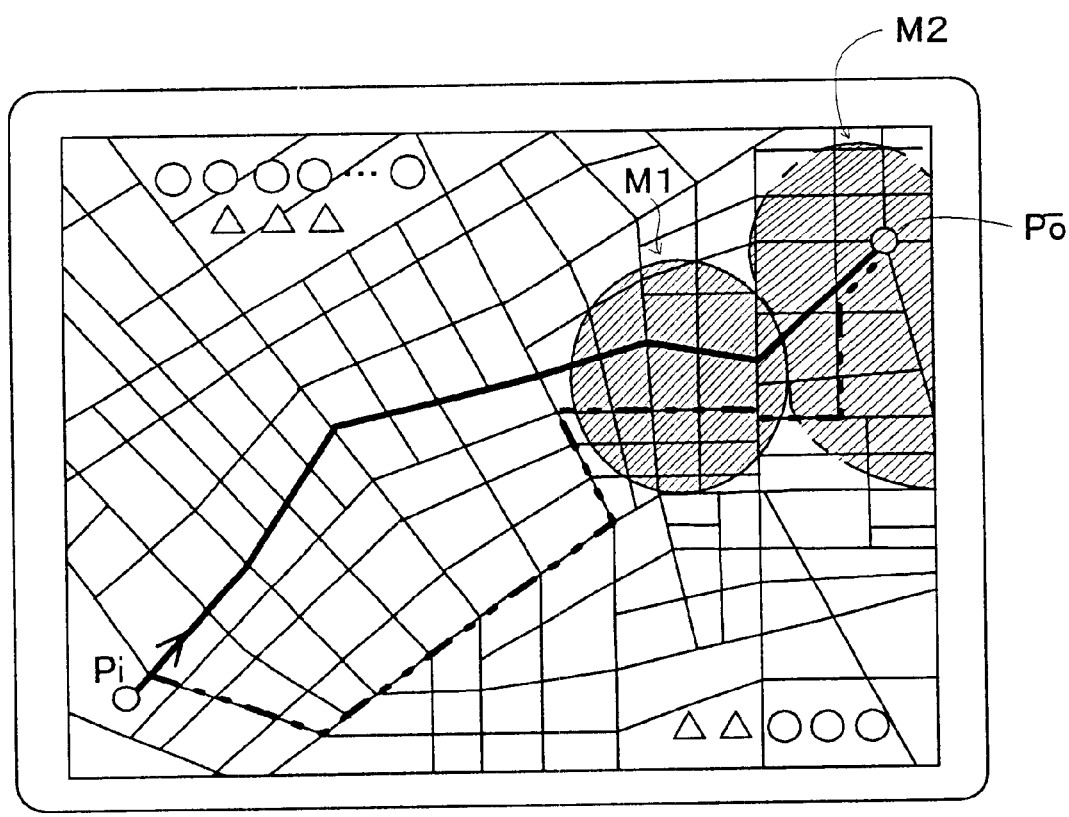
FIG. 7 is a schematic diagram to explain map information on optimum route search information transmitted by the communication center apparatus to the communication navigation terminal in the first embodiment.

Next, the route search request (step SA in FIG. 4) by the communication terminal 4 shown in FIG. 4 will be further explained with reference to FIG. 5 to FIG. 7. FIG. 5 is a flow chart showing processing procedures of the route search request at the communication terminal 4. FIG. 6A and FIG. 6B are schematic diagrams to explain window screens of the route search request. FIG. 7 is a schematic diagram to explain the map information on the optimum route search information transmitted by the communication center apparatus 3 to the communication navigation terminal 5.

In FIG. 1 to FIG. 6, the optimum route search to a desired destination from a desired origin is requested of the communication center apparatus 3 from the communication terminal 4. Firstly, the route search request information is prepared at the communication terminal 4 (step S1 in FIG. 5). The communication center apparatus 3 is accessed from the communication terminal 4 with a password, an identification numeral (ID), or the like, which is given in advance (step S2 and step S3). Then, the route search request information is transmitted to the communication terminal 4 from the communication center apparatus 3 (step S4).

This route search request transmission has the following two methods (A) and (B), for example.

(A) The transmission of the Route Search Request Information by E-mail

In a transmission method under the TCP/IP environment, the communication terminal 4 executes a mailer application program to transmit the route search request information. In this case, the route search request information contains instructions of the address of the origin and the destination (the name of stations and districts are also available) as illustrated with a screen window of the communication terminal 4 (an example of a cellular phone) shown in FIG. 6A. Moreover, this route search request information contains where to transmit (e.g. the address and the phone number of the communication navigation terminal 5) the route information indicating the optimum route (i.e. the guidance position information on the optimum route) from the communication center apparatus 3 as well as a transmission time (now or designated time).

(B) In the Case that the Communication Center Apparatus 3 is a Portal Site

By browsing with a Web browser mounted on the communication terminal 4 (which is a compact general-purpose computer in this case), the communication center apparatus 3 is accessed and the object of a map menu "a map of the whole country, districts (tourist attractions etc.), prefecture and municipality unit, and so on" as shown in FIG. 6B, which is transmitted from the communication center apparatus 3, is designated. The map information by this designation is transmitted to the communication terminal 4 from the communication center apparatus 3. The communication terminal 4 side performs pointer instruction of a destination from an origin. Moreover, it inputs where to transmit (e.g. the phone number and the address of the communication navigation terminal 5) the route information indicating the optimum route (i.e. the guidance position information on the optimum route) from the communication center apparatus 3 as well as the transmission time (now or designated time). These pieces of instruction information are transmitted to the communication center apparatus 3 from the communication terminal 4 by executing a utility program at a browser.

Incidentally, "in the case that the communication center apparatus 3 is a portal site", it is also possible to input the address of the origin and the destination in the same manner as the above-described "(1) the transmission of the route search request information by e-mail" to request the route search, instead of the instruction of the object to the map menu.

In addition, by designating not only one destination but one or more stopping places or intermediate destinations in the same manner as showing them in FIG. 6, the route search request information indicating the origin, the destination, and the stopping places or the intermediate destinations may be transmitted.

When the route search request information is transmitted to the communication center apparatus 3 in this manner, the communication center apparatus 3 checks the communication area D/B device 80 (refer to FIG. 3). Then, it is determined whether or not the destination is out of the service area, and if out of the service area, the announcement information indicating the fact with questions about the necessity of searching for a homeward route and the like is transmitted from the communication center apparatus 3. On the other hand, if the destination is not out of the service area, the announcement information is not transmitted from the communication center apparatus 3.

Then, the communication terminal 4 determines whether to receive this announcement information (step S5). If the announcement information has not been received (step S5: No), the operational flow ends.

On the other hand, if the announcement information has been received (step S5: Yes), the user newly requests the route search, considering the contents of the announcement information (step S6). Then, the route search request information indicating this is transmitted (step S7) and a series of operations ends. For example, the route search request information indicating the request of a search for one circulation route, which starts the origin, passes through the destination, and comes back to the origin with an outward route and a homeward route included therein, is transmitted. Alternatively, the route search request information indicating the request of a search for the homeward route separately from the outward route is transmitted. Moreover, assuming that the route search for the homeward route is unnecessary, it is also possible to transmit the route search request information exactly the same as the one in step S1 and the request information indicating an unnecessary change.

Especially in the first embodiment, "in the case that the communication center apparatus 3 is a portal site", as described above, the map information on out of the service area shown in FIG. 7 may be added to the announcement information received in step S5. In FIG. 7, outer service areas M1 and M2 are shown in shaded areas on a display map of the vicinity of a destination Po. If displaying in this manner, the user can visually recognize that it is impossible to request the route search of the communication center apparatus 3 at the destination Po and then request the route search between the destination Po and an origin Pi, which will be a homeward route again. Incidentally, in this case, it is also possible to execute the route search at the communication center apparatus 3 before the announcement information is transmitted and then transmit the map information including the outward route (the thick line) as shown in FIG. 7 as well as the announcement information. Moreover, it is also possible to search for the homeward route provisionally in this step and transmit the map information including the provisional homeward route (the dashed line) with the announcement information.

As shown in FIG. 7, if the outer service areas M1 and M2 are displayed on a map, it is possible to sense in advance the difficulty in obtaining on the communication navigation system various information such as facility information, guidance information, and the like along the route in the vicinity of the destination, or the homeward route, which is extremely useful for preparation. For example, if the destination is slightly on the edge of the outer service area, it becomes possible for the user to judge that it is enough to search for the homeward route through the communication network when entering the service area after starting the destination. In contrast, if the destination is in the middle of the broad outer service area, it also becomes possible for the user to judge that various information on the vicinity of the destination should be obtained as much as possible in advance.

Figure 8:
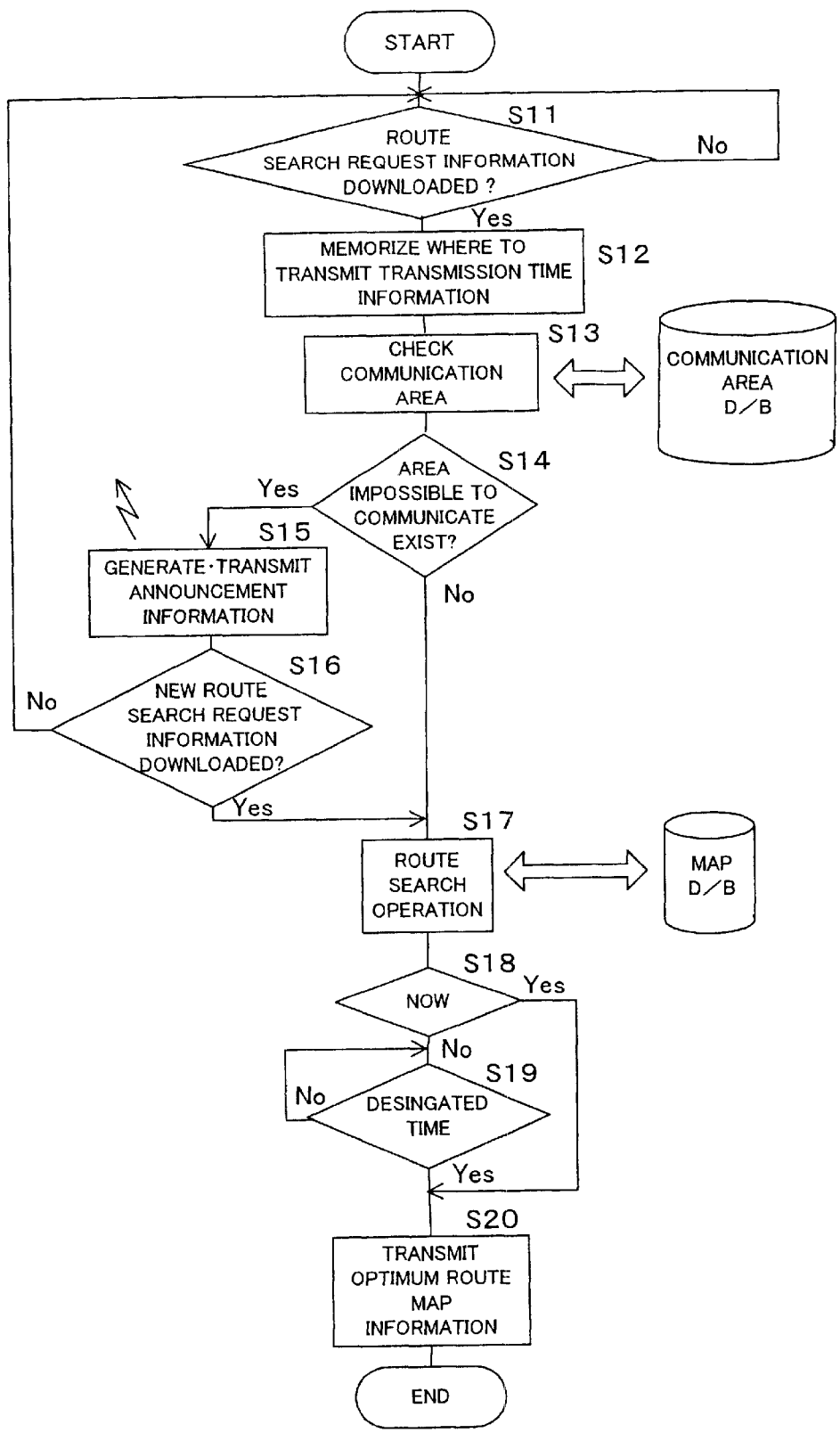
FIG. 8 is a flow chart showing processing procedures at the communication center apparatus in the first embodiment.

Next, the search processing (step SB in FIG. 4) of the optimum route at the communication center apparatus 3 will be further explained with reference to FIG. 8. FIG. 8 is a flow chart showing processing procedures at the communication center apparatus 3 shown in FIG. 3.

In FIG. 1 to FIG. 4, FIG. 7 and FIG. 8, when the route search request information is received from the communication terminal 4 (step S11), information on where to transmit is stored with transmission time information (immediacy or designated time) from the communication terminal 4 (step S12). Then, the communication center apparatus 3 checks the communication area (district) D/B device 80 (refer to FIG. 3) (step S13).

In this checking, if outer service area information is included in this route search request information (step S14: Yes), the above described announcement information is transmitted to the communication terminal 4 (step S15). In this case, it is also possible to transmit map information indicating the outer service area along the route or in the vicinity the destination at the same time, as described above (refer to FIG. 7).

Then, it is determined whether the route search request information with respect to this announcement information is again incorporated from the communication terminal 4 (step S16, refer to FIG. 5).

If the route search request information is not newly incorporated (step S16: No), the operational flow returns to step S11 and the operation is started again.

On the other hand, if the route search request information is newly incorporated (step S16: Yes), the operational flow goes on to step S17, as is the case that the outer service area does not exist in step S14 (step S14: No).

Then, the optimum route search with respect to the route search request information is executed by D/B engine tracking at the map information processing database device 74, and the map information (the map D/B information) in which the optimum route is matched on roads is obtained (step S17). Especially, in this case, the route search is searched for by Dijkstra method or the like by using the information for route search, whose information volume is enormous, at the map information processing D/B device 74. Since the side of the communication center apparatus can perform high-speed large-scale processing, the route search described above can be also performed at high speed and with high accuracy.

Then, the transmission time information, which is memorized because of the previous designation by the communication terminal 4, is read out, and if now (immediacy) is designated here (step S18: Yes), the map D/B information in which the optimum searched route is matched on roads is transmitted to the communication circuit network from the communication control device 73 with respect to the address and the phone number of the communication navigation terminal 5 (step S20). Incidentally, if not transmitted now (if not immediately transmitted) in step S18, namely, if the transmission time is designated (step S19: No), when the time is measured with the timer circuit 82 in FIG. 3, the map D/B information in which the optimum searched route is matched on roads is transmitted as is the case with now (immediacy) as described above (step S20).

Incidentally, in this optimum route search processing, the optimum route that has, for example, the shortest driving distance is chosen from plurality of routes which can be searched for. It is also possible to choose the substantial optimum route with weighting. For example, the optimum route which gives the shortest time length in driving can be chosen as result of considering traffic congestion by traffic information (VICS: Vehicle Information and Communication System).

Next, the screen display of the optimum route onto a map (road) at the communication navigation terminal 5 (step SC in FIG. 4) will be explained.

Figure 9:
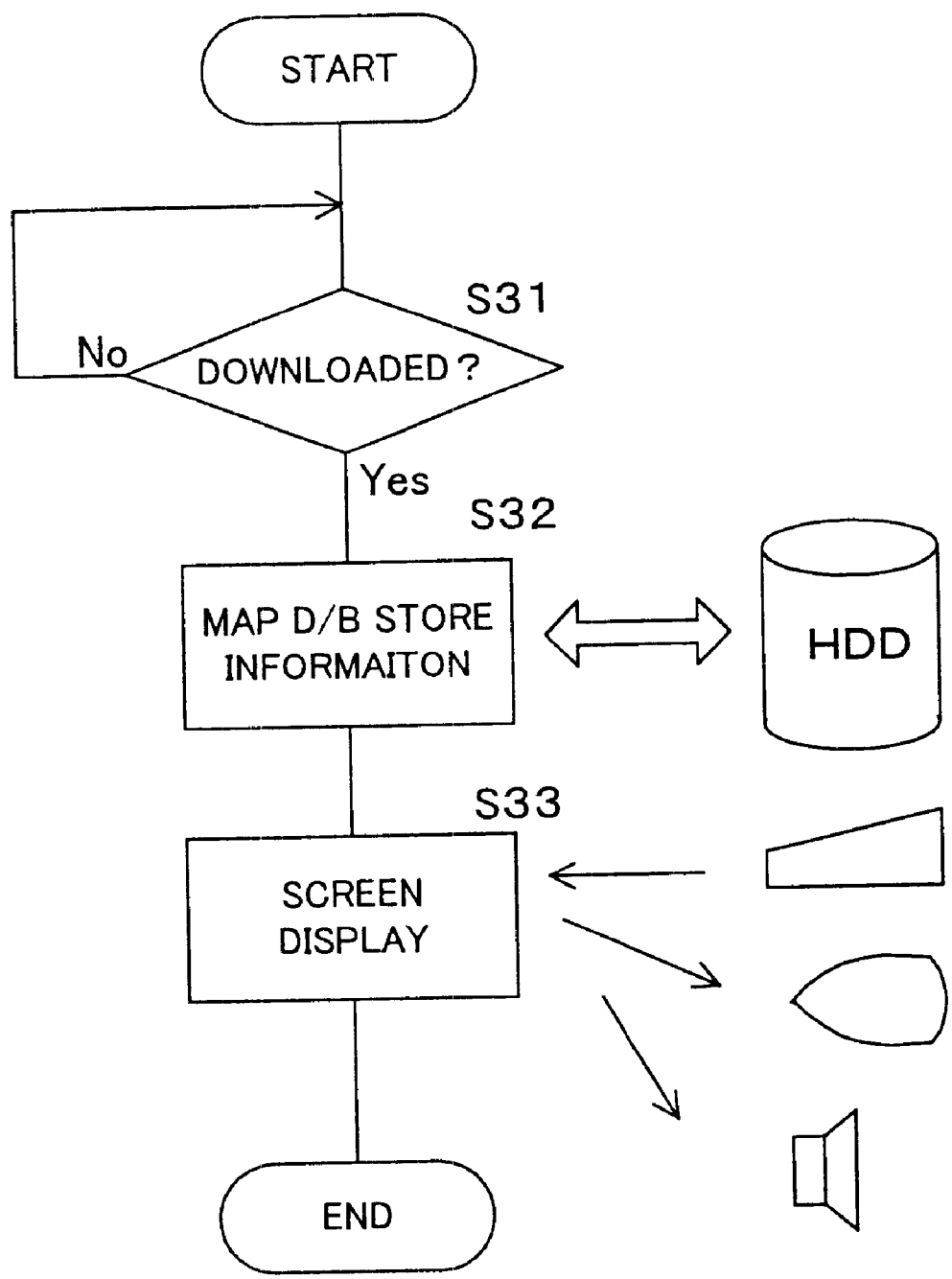
FIG. 9 is a flow chart showing processing procedures at the communication navigation terminal in the first embodiment.
Figure 10:
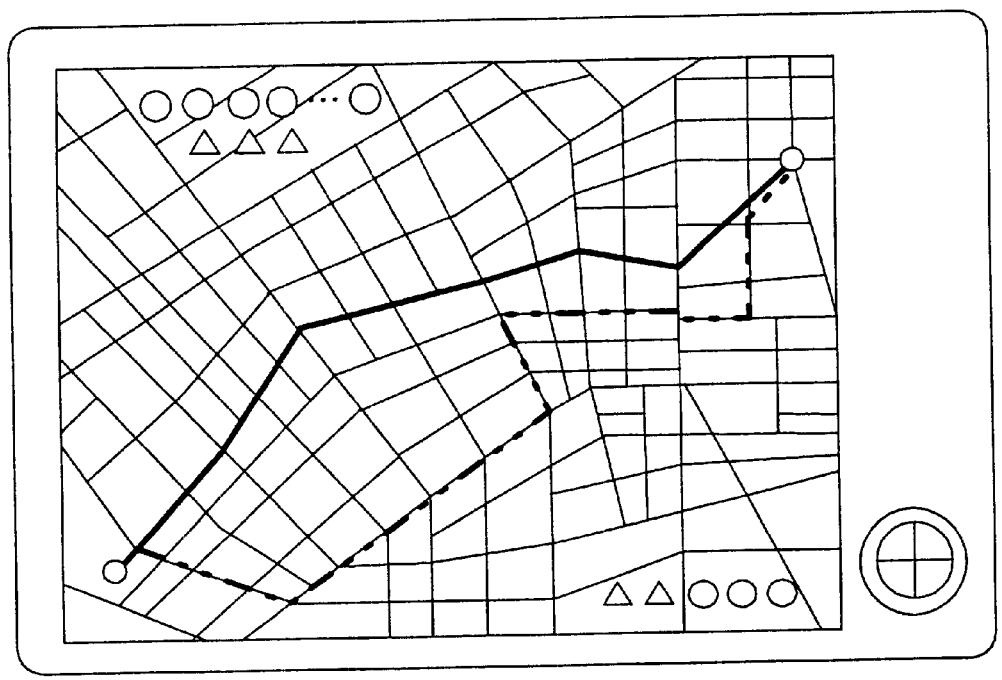
FIG. 10 is a schematic diagram to explain a road map displaying an optimum route in the first embodiment.

FIG. 9 is a flow chart showing processing procedures at the communication navigation terminal 5. FIG. 10 is a schematic diagram to explain a road map displaying an optimum route.

In FIG. 9, when the map D/B information in which the optimum route from the communication center apparatus 3 is matched on roads is received (step S31), it is stored in the hard disk device (HDD) 36 in FIG. 2 (step S32). Then, the map D/B information in which the optimum route is matched on roads is screen-displayed (step S33). Incidentally, this screen display is the same as the case of a single use when mounting the navigation apparatus on a vehicle as is the existing manner, and the screen-display shown in FIG. 10 is performed as well as the guidance information by voice or sound and the like. Onto the display screen, a display road map, a location of a vehicle, a moving direction, a scale circle/radius, a driving locus, map directions, or the like, all of which are not illustrated in FIG. 10, are given, and various guidance in driving of a vehicle, e.g. the guidance of facilities and that of moving directions performed just before reaching an intersection, is performed. The operations of these various types of guidance, their choosing instructions, and the like are well known, and their detailed explanations are omitted here. In addition, even in the screen-display in FIG. 10, the outer service area may be shown in a shaded area or the like, as is the case with FIG. 7.

As described above, in the case that the user requests the route search of the communication center apparatus 3 from the communication terminal 4 through the mobile communication network, it becomes possible to carry out the route search of the outer service area in advance and then provide and obtain the route search information, which improves the convenience of the user.

(II) Second Embodiment

In the second embodiment, when the optimum route search is requested from the communication navigation terminal 5, the communication center apparatus 3 provides weather forecast information, especially, that of the destination.

Figure 11:
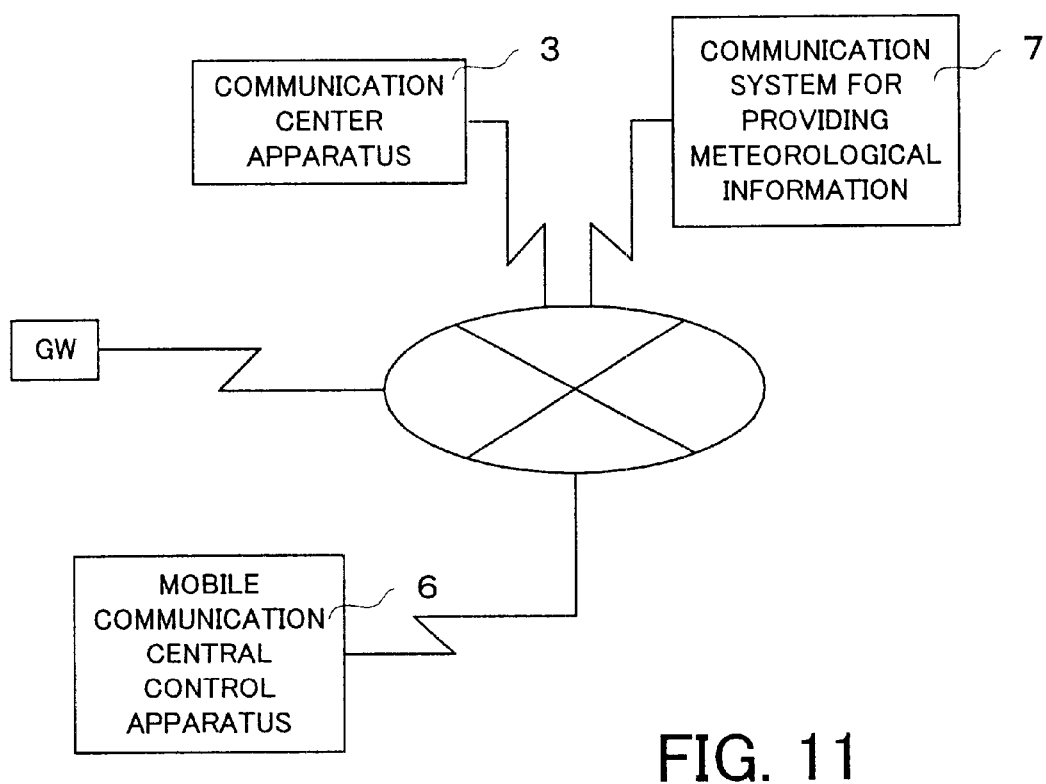
FIG. 11 is a block diagram showing the structure of a main part corresponding to a second embodiment of the present invention.

FIG. 11 is a block diagram showing the structure of a main part corresponding to the second embodiment.

In FIG. 11, there is installed a communication system 7 for providing meteorological information added to the structure in FIG. 1. This communication system 7 for providing meteorological information is, for example, computer system for meteorological services (COSMETS).

Next, the operations in the second embodiment will be explained.

Figure 12:
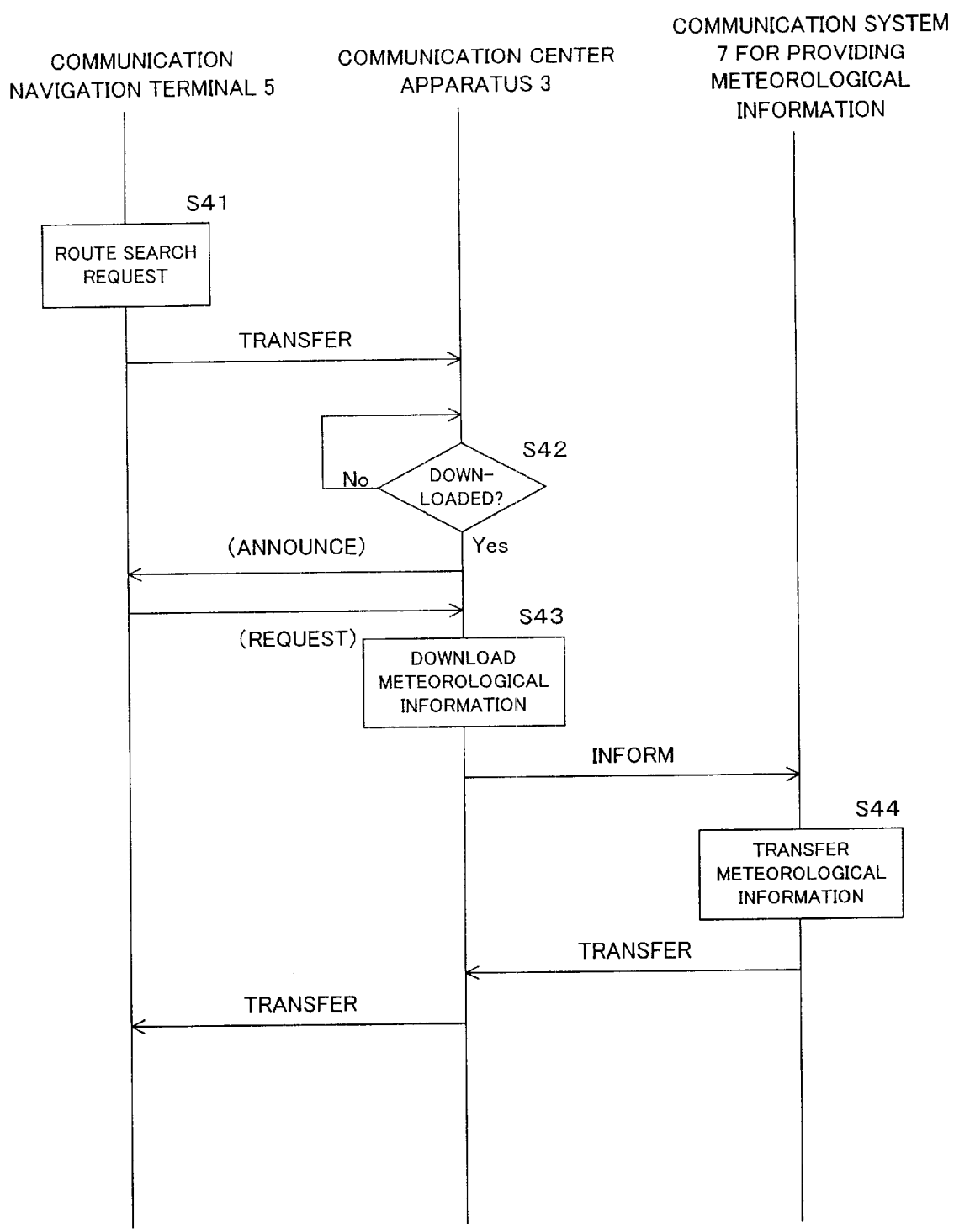
FIG. 12 is a flow chart showing processing procedures of providing and obtaining meteorological information on the communication network in the second embodiment.

FIG. 12 is a flow chart showing processing procedures of providing and obtaining meteorological information on the communication network in the second embodiment.

In FIG. 11 and FIG. 12, the route search is requested of the communication center apparatus 3 from the communication navigation terminal 5 (step S41). If the destination or the route heading to it is included in the outer service area of the communication navigation system, the communication center apparatus 3 encourages the provision of the meteorological information as well as transmission of the announcement information indicating the fact (e.g. the communication center apparatus 3 transmits information for encourage the provision of the meteorological information together with or contained in the announcement information.). With respect to this announcement information, when request information indicating the desire of providing the meteorological information from the communication navigation terminal 5 is received at the communication center apparatus 3, the optimum route search corresponding to the route search request information is executed and at the same time the communication system 7 for providing meteorological information is informed of each area of this route (steps S42, S43). The communication system 7 for providing meteorological information transfers information on weather and meteorological forecast of a current time, today, or tomorrow or the like in each area from a current position to the destination (step S44). As a result, the information on weather and meteorological forecast is referred to by the user of the communication navigation terminal 5. The operations other than this are the same as those in the first embodiment, and their explanation will be omitted.

As described above, in the second embodiment, it is impossible to have the provision of the meteorological information by using the communication network out of the service area, however, the communication navigation terminal 5 can obtain the meteorological information in advance while inside the service area, which is useful.

Incidentally, in the above first and second embodiments, the route search is requested from the communication terminal 4, and additionally, a facsimile device can be used to transmit it. Moreover, if the optimum route search request at the communication center apparatus 3 charges, its fee can be paid on the communication network. In this case, a net bank communication system is added and installed to the structure in FIG. 1. This fee can be paid by credit cards, debit cards, e-cash/digital-cash, and universal Web currency (beenz).

In addition, in the above first and second embodiments, it is explained that the communication center apparatus 3 is installed on the digital fixed communication circuit network 1 and that the communication navigation terminal 5 is mounted on a vehicle, however they are not limited to this. For example, the example that the present invention is applied for such a communication navigation system of global scale that the communication center apparatus 3 is installed on a satellite station or an earth station on satellite communication and that the communication navigation terminal 5 is a hand-carry or portable type, is within the scope of design matters and is included in the present invention.

Modified Embodiment

Each embodiment described above is constructed such that the route information indicating the optimum route and the meteorological information are obtained before entering the outer service area. It is also possible to obtain information other than these information before entering the outer service area. For example, it is possible to construct to obtain the facility information on various facilities around the destination, tourist information on tourist attractions and famous places, a timetable and a list of charges of various movable bodies (e.g. a train, a ship or the like), a menu list, and the like. Especially, according to the present invention, the communication network can be used around the destination, and if necessary, there is no need to dare to obtain information obtainable almost in real time, and it is possible to obtain in advance and selectively only information impossible to obtain through the communication network around the destination, so that it is extremely efficient as a whole to transmit and receive data, store data, process data, and the like.

Moreover, in the case that not only the destination, but each of the one or more stopping places or intermediate destinations shown by the route search request information is out of the service area, it is also possible to construct to ask by the announcement information about the necessity of the route search, the facility guidance, the travel guidance, and the like related to the stopping places or the intermediate destinations. Even in the case that the searched route partially passes through the outer service area after the search for the optimum route at the communication center apparatus 3, it is also possible to construct to ask by the announcement information about the necessity of the route search, the facility guidance, the travel guidance, and the like related to the outer service area. In any case, if passing through the outer service area while actually driving, as long as there is the possibility of having some kind of information provision while the passing, it is extremely useful in practice to ask the user about the necessity of various information in view of the presence of the outer service area.

Furthermore, even as for the information for route search which is generally enormous and which enables the route search, it may be constructed to limitedly obtain only the portion on the outer service area in advance on the side of the communication navigation terminal 5. By constituting in this manner, the user can feel relaxed to enter into the area insecure for the user of the communication navigation system such as the outer service area, and if deviating from the planned route by some reasons, the user becomes able to return to the route, search for a new route, or the like.

In each embodiment described above, it is constructed to firstly transmit the announcement information and then ask the user about the necessity of obtaining the information on the outer service area. It may also be constructed to transmit various information on the outer service area as outer area information to the communication navigation terminal 5 without asking the user when determined that the destination or the route is included in the outer service area, then prestoring this in the hard disk device 36 on the communication navigation terminal 5. By constituting in this manner, even out of the service area where the function of the communication navigation system extremely deteriorate, the use of the prestored certain outer back up information compensates this deterioration in the function and enables the navigation operation to some degree, which is useful in practice.

Incidentally, the above described communication navigation terminal of the present invention may be applied for various navigation terminal, not for a vehicle as described in each embodiment above, but for various movable bodies such as an airplane, a ship, a bicycle, or the like. It may be further applied for those for an animal and a pedestrian, who uses a mobile phone, a mobile or hand-carry type information terminal, or the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-266470 filed on Sep. 3, 2001 including the specification, claims, drawings and summary is incorporated herein by reference in its entirety.

What is claimed is:

1. A communication navigation system comprising a communication center apparatus and a communication terminal apparatus, both of which transmit and receive information by two-way communication through a communication network, (i) the communication center apparatus comprising:
    a processing device for generating request correspondence information including route information indicating a planned route corresponding to request information and generating, if at least one portion of the planned route is present out of a service area of the communication navigation system, announcement information for announcing that the at least one portion of the planned route is present out of the service area; and
    a center side communication device for receiving the request information and transmitting the request correspondence information and the announcement information through the communication network, (ii) the communication terminal apparatus comprising:
    a terminal side communication device for transmitting the request information and receiving at least the announcement information through the communication network; and
    an input device for inputting the request information and giving an opportunity of inputting the request information in response to the reception of the announcement information.

2. A communication navigation system according to claim 1, wherein
    the communication terminal apparatus comprises a communication navigation terminal to be mounted on a movable body,
    the terminal side communication device receives the request correspondence information in addition to the announcement information, and
    the communication navigation terminal comprises an output device for outputting the received request correspondence information in a predetermined format.

3. A communication navigation system according to claim 1, wherein
    the communication terminal apparatus comprises a terminal for users which is not mounted on a movable body and
    the terminal side communication device receives the request correspondence information in addition to the announcement information.

4. A communication navigation system according to claim 1, wherein
    the communication terminal apparatus comprises a terminal for users which is not mounted on a movable body,
    the communication navigation system further comprises a communication navigation terminal mounted on a movable body and connected to the communication network, and
    the center side communication device transmits the request correspondence information to the communication navigation terminal.

5. A communication navigation system according to claim 1, wherein
    if at least one portion of the planned route is present out of the service area, the processing device generates outer area information related to an area which is out of the service area in addition to the announcement information and
    the center side communication device transmits the outer area information in addition to the announcement information.

6. A communication navigation system according to claim 1, wherein the processing device generates the request correspondence information including the route information indicating a return route from a destination designated by the received request information which is inputted with the input device in response to the reception of the announcement information.

7. A communication navigation system according to claim 1, wherein the communication center apparatus further comprises a map database for storing therein map database information including information for route search which enables route search to a destination from a current position of a movable body by predetermined algorithm and the processing device generates the route information by searching for a route heading to the destination from the current position by the predetermined algorithm, on the basis of the map database information and the received request information.

8. A communication navigation system according to claim 1, wherein the communication center apparatus further comprises a map database for storing therein map database information including service area information indicating whether each area is present out of or within the service area and the processing device determines whether or not at least one portion of the planned route is present out of the service area, on the basis of the service area information.

9. A communication navigation system comprising a communication center apparatus and a communication terminal apparatus, both of which transmit and receive information by two-way communication through a communication network, (i) the communication center apparatus comprising:
a processing device for generating request correspondence information including route information indicating a planned route corresponding to request information and generating, if at least one portion of the planned route is present out of a service area of the communication navigation system, outer area information related to an area which is out of the service area; and
a center side communication device for receiving the request information and transmitting the request correspondence information and the outer area information through the communication network, (ii) the communication terminal apparatus comprising:
a terminal side communication device for receiving the request correspondence information and the outer area information through the communication network; and
a memory device for storing therein the outer area information.

10. A communication navigation system according to claim 9, wherein the communication terminal apparatus comprises a communication navigation terminal to be mounted on a movable body, and the communication navigation terminal comprising:
an output device for outputting the received request correspondence information in a predetermined format;
an input device for inputting the request information; and
a generating device for generating the request correspondence information with respect to the request information related to the area which is out of the service area inputted from the input device on the basis of the outer area information stored in the memory device if the movable body is present out of the service area.

11. A communication navigation system according to claim 9, wherein the communication terminal apparatus comprises a terminal for users which is not mounted on a movable body.

12. A communication navigation system according to claim 9, wherein the communication center apparatus further comprises a map database for storing therein map database information and the processing device generates the outer area information by extracting from the map database a portion related to the area which is out of the service area out of the map database information.

13. A communication navigation system according to claim 12, wherein the map database information includes at least one information out of map information, facility guidance information, travel guidance information, and meteorological information on each area which is divided into by predetermined unit.

14. A communication navigation system according to claim 9, wherein the processing device generates the route information indicating a return route from a destination designated by the received request information or map information required to search for the route information indicating the return route as the outer area information.

15. A communication navigation system according to claim 9, wherein the communication center apparatus further comprises a map database for storing therein map database information including information for route search which enables route search to a destination from a current position of a movable body by predetermined algorithm and the processing device generates the route information by searching for a route heading to the destination from the current position by the predetermined algorithm, on the basis of the map database information and the received request information.

16. A communication navigation system according to claim 9, wherein the communication center apparatus further comprises a map database for storing therein map database information including service area information indicating whether each area is present out of or within the service area and the processing device determines whether or not at least one portion of the planned route is present out of the service area, on the basis of the service area information.

17. A communication center apparatus for transmitting and receiving information by two-way communication through a communication network with respect to a communication terminal apparatus comprising:

(i) a terminal side communication device for transmitting request information and receiving at least announcement information through the communication network; and (ii) an input device for inputting the request information and giving an opportunity of inputting the request information in response to the reception of the announcement information, the communication center apparatus comprising:
a processing device for generating the request correspondence information including route information indicating a planned route corresponding to the received request information and generating, if at least one portion of the planned route is present out of a service area of the communication navigation system, the announcement information for announcing that the at least one portion of the planned route is present out of the service area; and a center side communication device for receiving the request information and transmitting the request correspondence information and the announcement information through the communication network.

18. A communication center apparatus for transmitting and receiving information by two-way communication through a communication network with respect to a communication terminal apparatus comprising:

(i) a terminal side communication device for receiving request correspondence information and outer area information through the communication network; and (ii) a memory device for storing therein the outer area information, the communication center apparatus comprising:

a processing device for generating the request correspondence information including route information indicating a planned route corresponding to request information and generating, if at least one portion of the planned route is present out of a service area of the communication navigation system, the outer area information related to an area which is out of the service area; and a center side communication device for receiving the request information and transmitting the request correspondence information and the outer area information through the communication network.

19. A program storage device readable by a computer for tangibly embodying a program of instructions executable by the computer to perform a communication navigation method in a communication navigation system, the communication system comprising a communication center apparatus and a communication terminal apparatus, both of which transmit and receive information by two-way communication through a communication network, the communication navigation method comprising:

(i) at the communication center apparatus, a generating process of generating request correspondence information including route information indicating a planned route corresponding to request information and generating, if at least one portion of the planned route is present out of a service area of the communication navigation system, announcement information for announcing that the at least one portion of the planned route is present out of the service area; and a center side communication process of receiving the request information and transmitting the request correspondence information and the announcement information through the communication network, and (ii) at the communication terminal apparatus, a terminal side communication process of transmitting the request information and receiving at least the announcement information through the communication network; and an inputting process for inputting the request information and giving an opportunity of inputting the request information in response to the reception of the announcement information.

20. A program storage device readable by a computer for tangibly embodying a program of instructions executable by the computer to perform a communication navigation method in a communication navigation system, the communication navigation system comprising a communication center apparatus and a communication terminal apparatus, both of which transmit and receive information by two-way communication through a communication network, the communication navigation method comprising:

(i) at the communication center apparatus, a generating process of generating request correspondence information including route information indicating a planned route corresponding to request information and generating, if at least one portion of the planned route is present out of a service area of the communication navigation system, outer area information related to an area which is out of the service area; and a center side communication process of receiving the request information and transmitting the request correspondence information and the outer area information through the communication network, and (ii) at the communication terminal apparatus, a terminal side communication process of receiving the request correspondence information and the outer area information through the communication network; and a storing process of storing therein the outer area information.

21. A program storage device readable by a computer for tangibly embodying a program of instructions executable by the computer to perform a communication navigation method at a communication center apparatus in a communication navigation system, the communication navigation system comprising the communication center apparatus and a communication terminal apparatus, both of which transmit and receive information by two-way communication through a communication network, the communication terminal apparatus comprising:

(i) a terminal side communication device for transmitting request information and receiving at least announcement information through the communication network; and (ii) an input device for inputting the request information and giving an opportunity of inputting the request information in response to the reception of the announcement information, the communication navigation method comprising:

a generating process of generating the request correspondence information including route information indicating a planned route corresponding to the received request information and generating, if at least one portion of the planned route is present out of a service area of the communication navigation system, announcement information for announcing that the at least one portion of the planned route is present out of the service area; and a center side communication process of receiving the request information and transmitting the request correspondence information and the announcement information through the communication network.

22. A program storage device readable by a computer for tangibly embodying a program of instructions executable by the computer to perform a communication navigation method at a communication center apparatus in a communication navigation system, the communication navigation system comprising the communication center apparatus and a communication terminal apparatus, both of which transmit and receive information by two-way communication through a communication network, the communication terminal apparatus comprising:

(i) a terminal side communication device for receiving request correspondence information and outer area information through the communication network; and (ii) a memory device for storing therein the outer area information, the communication navigation method comprising:

a generating process of generating the request correspondence information including route information indicating a planned route corresponding to request information and generating, if at least one portion of the planned route is present out of a service area of the communication navigation system, the outer area information related to an area which is out of the service area; and a center side communication process of receiving the request information and transmitting the request correspondence information and the outer area information through the communication network.

23. A computer data signal embodied in a carrier wave and representing a series of instructions which cause a computer to perform a communication navigation method in a communication navigation system, the communication system comprising a communication center apparatus and a communication terminal apparatus, both of which transmit and receive information by two-way communication through a communication network, the communication navigation method comprising:

(i) at the communication center apparatus, a generating process of generating request correspondence information including route information indicating a planned route corresponding to request information and generating, if at least one portion of the planned route is present out of a service area of the communication navigation system, announcement information for announcing that the at least one portion of the planned route is present out of the service area; and a center side communication process of receiving the request information and transmitting the request correspondence information and the announcement information through the communication network, and (ii) at the communication terminal apparatus, a terminal side communication process of transmitting the request information and receiving at least the announcement information through the communication network; and an inputting process for inputting the request information and giving an opportunity of inputting the request information in response to the reception of the announcement information.

24. A computer data signal embodied in a carrier wave and representing a series of instructions which cause a computer to perform a communication navigation method in a communication navigation system, the communication navigation system comprising a communication center apparatus and a communication terminal apparatus, both of which transmit and receive information by two-way communication through a communication network, the communication navigation method comprising:

(i) at the communication center apparatus, a generating process of generating request correspondence information including route information indicating a planned route corresponding to request information and generating, if at least one portion of the planned route is present out of a service area of the communication navigation system, outer area information related to an area which is out of the service area; and a center side communication process of receiving the request information and transmitting the request correspondence information and the outer area information through the communication network, and (ii) at the communication terminal apparatus, a terminal side communication process of receiving the request correspondence information and the outer area information through the communication network; and a storing process of storing therein the outer area information.

25. A computer data signal embodied in a carrier wave and representing a series of instructions which cause a computer to perform a communication navigation method at a communication center apparatus in a communication navigation system, the communication navigation system comprising the communication center apparatus and a communication terminal apparatus, both of which transmit and receive information by two-way communication through a communication network, the communication terminal apparatus comprising:

(i) a terminal side communication device for transmitting request information and receiving at least announcement information through the communication network; and (ii) an input device for inputting the request information and giving an opportunity of inputting the request information in response to the reception of the announcement information, the communication navigation method comprising:

a generating process of generating the request correspondence information including route information indicating a planned route corresponding to the received request information and generating, if at least one portion of the planned route is present out of a service area of the communication navigation system, announcement information for announcing that the at least one portion of the planned route is present out of the service area; and a center side communication process of receiving the request information and transmitting the request correspondence information and the announcement information through the communication network.

26. A computer data signal embodied in a carrier wave and representing a series of instructions which cause a computer to perform a communication navigation method at a communication center apparatus in a communication navigation system, the communication navigation system comprising the communication center apparatus and a communication terminal apparatus, both of which transmit and receive information by two-way communication through a communication network, the communication terminal apparatus comprising:

(i) a terminal side communication device for receiving request correspondence information and outer area information through the communication network; and (ii) a memory device for storing therein the outer area information, the communication navigation method comprising:

a generating process of generating the request correspondence information including route information indicating a planned route corresponding to request information and generating, if at least one portion of the planned route is present out of a service area of the communication navigation system, the outer area information related to an area which is out of the service area; and a center side communication process of receiving the request information and transmitting the request correspondence information and the outer area information through the communication network.

27. A communication navigation method executed in a communication navigation system, the communication system comprising a communication center apparatus and a communication terminal apparatus, both of which transmit and receive information by two-way communication through a communication network, the communication navigation method comprising:

(i) at the communication center apparatus, a generating process of generating request correspondence information including route information indicating a planned route corresponding to request information and generating, if at least one portion of the planned route is present out of a service area of the communication navigation system, announcement information for announcing that the at least one portion of the planned route is present out of the service area; and a center side communication process of receiving the request information and transmitting the request correspondence information and the announcement information through the communication network, and (ii) at the communication terminal apparatus, a terminal side communication process of transmitting the request information and receiving at least the announcement information through the communication network; and an inputting process for inputting the request information and giving an opportunity of inputting the request information in response to the reception of the announcement information.

28. A communication navigation method executed in a communication navigation system, the communication navigation system comprising a communication center apparatus and a communication terminal apparatus, both of which transmit and receive information by two-way communication through a communication network, the communication navigation method comprising:

(i) at the communication center apparatus, a generating process of generating request correspondence information including route information indicating a planned route corresponding to request information and generating, if at least one portion of the planned route is present out of a service area of the communication navigation system, outer area information related to an area which is out of the service area; and a center side communication process of receiving the request information and transmitting the request correspondence information and the outer area information through the communication network, and (ii) at the communication terminal apparatus, a terminal side communication process of receiving the request correspondence information and the outer area information through the communication network; and a storing process of storing therein the outer area information.

* * * * *